(12) United States Patent
Aoshima et al.

(10) Patent No.: US 7,046,365 B1
(45) Date of Patent: May 16, 2006

(54) LIGHT TRACK OBSERVING DEVICE

(75) Inventors: Shinichiro Aoshima, Hamamatsu (JP); Masatoshi Fujimoto, Hamamatsu (JP); Makoto Hosoda, Hamamatsu (JP); Yutaka Tsuchiya, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 333 days.

(21) Appl. No.: 10/343,017

(22) PCT Filed: Jul. 27, 2000

(86) PCT No.: PCT/JP00/05029

§ 371 (c)(1),
(2), (4) Date: Jan. 27, 2003

(87) PCT Pub. No.: WO02/10722

PCT Pub. Date: Feb. 7, 2002

(30) Foreign Application Priority Data

Jan. 27, 1999 (JP) .................................. 11-018793
May 28, 1999 (JP) .................................. 11-150073

(51) Int. Cl.
*G01B 9/02* (2006.01)

(52) U.S. Cl. ...................................... 356/450; 356/491
(58) Field of Classification Search ................ 356/450, 356/484, 491
See application file for complete search history.

(56) References Cited

U.S. PATENT DOCUMENTS 5,530,544 A * 6/1996 Trebino et al. ............. 356/450

FOREIGN PATENT DOCUMENTS

| JP | 03-185339 | 8/1991 |
|---|---|---|
| JP | 05-172739 | 7/1993 |
| JP | 10-206234 | 8/1998 |
| JP | 2000-214082 | 8/2000 |
| WO | WO 97/45747 | 12/1997 |

OTHER PUBLICATIONS

Borghesi, M., et al., "Large Quasistatic Magnetic Fields Generated by a Relativistically Intense Laser Pulse Propagating in a Preionized Plasma," Physical Review Letters, The American Physical Society, vol. 80, No. 23, Jun. 8, 1998, pps. 5137-5140.

* cited by examiner

*Primary Examiner*—Samuel A. Turner
(74) *Attorney, Agent, or Firm*—Drinker, Biddle & Reath LLP

(57) ABSTRACT

A light pulse from an ultrashort pulse light source 11 is split by a beam splitter 12 and guided, to a detection medium 4, as an excitation pulse and probe pulse having respective predetermined linearly polarized states by an excitation optical system 2 and probe optical system 3, respectively. A light track region which is generated in the detection medium 4 by incidence of the excitation pulse, and in which the refractive index is changed by a nonlinear optical effect, is irradiated with the probe pulse. Of components which have passed through the detection medium 4, a probe pulse component whose polarized state has changed through the light track region is detected by a camera 53 via an analyzer 51 in a photodetection part 5. This realizes a light track observation apparatus capable of directly observing the light track of an excitation pulse.

21 Claims, 14 Drawing Sheets

WAVELENGTH (CORRESPONDING TO TIME)

NO SLIT

→ PROPAGATION DIRECTION

VERTICAL SLIT

HORIZONTAL SLIT

45° SLIT

Fig.17A IMAGE BY FIRST PROBE PULSE

Fig.17B IMAGE BY SECOND PROBE PULSE

Fig.17C OBSERVATION IMAGE

LIGHT TRACK OBSERVING DEVICE

TECHNICAL FIELD

The present invention relates to a light track observation apparatus capable of observing the track of light such as a light pulse.

BACKGROUND ART

With the advance of laser technologies such as a high-intensity, ultrashort pulse laser, a nonlinear optical effect such as the optical Kerr effect, which is brought about by a laser beam having intensity larger than that of normal light, of a material and various phenomena caused by the effect are becoming problems. That is, the nonlinear susceptibility of a material with respect to a higher-order term than the second order of an electric field is smaller than that for a first-order term, so only a linear response is observed for normal light. On the other hand, the above-mentioned effect of a second-order nonlinear term or higher appears for light, such as a laser beam, having a sufficiently large intensity (electric field).

Examples of this nonlinear optical effect are the self-focusing effect of light produced when a material is irradiated with large-intensity light pulse, and the self-trapping effect such as channeling or filamentation by which light propagates with its beam diameter kept small.

DISCLOSURE OF INVENTION

Recently, it is being attempted to use the above various phenomena to, e.g., control a laser beam. However, these phenomena sometimes pose problems when an ultrashort pulse laser and the like are used. For example, a light pulse which has caused the self-focusing effect or self-trapping effect destroys an optical element or optical material such as a lens, thereby producing defects.

Also, when a light pulse is to be focused to a gas or liquid, a laser plasma is generated, and its scattering interferes with effective light focusing. To avoid this problem, an optical system must be evacuated. This necessity restricts the apparatus arrangement or the light pulse use conditions.

To solve these problems, it is important to establish a technique to directly observe the track of a light pulse in a material. However, no such observation method or apparatus is conventionally known.

The present invention has been made to solve the above problems, and has as its object to provide a light track observation apparatus capable of directly observing the track of a light pulse.

To achieve the above object, a light track observation apparatus according to the present invention is characterized by comprising a light source part for generating and outputting first and second light beams having synchronized output timings, from a light pulse supplied by a pulse light source, a detection medium by which the track of a light pulse is detected and observed, an excitation optical system for forming an excitation pulse on the basis of the first light beam, and feeding the excitation pulse into the detection medium, a probe optical system for forming a probe pulse on the basis of the second light beam, and irradiating, with the probe pulse, a predetermined region of the detection medium, which includes a light track region in which the refractive index is changed by a nonlinear optical effect when the excitation pulse is fed into the detection medium, and a photodetection part for detecting the probe pulse which has passed through the predetermined region of the detection medium, wherein the excitation optical system comprises excitation pulse polarizing means for setting the excitation pulse into a predetermined polarized state, and an incident optical system for feeding the excitation pulse into the detection medium under predetermined incident conditions, the probe optical system comprises probe pulse polarizing means for setting the probe pulse into a predetermined polarized state, and the photodetection part comprises analyzing means for transmitting only a predetermined polarized light component of the probe pulse which has passed through the predetermined region of the detection medium, light detecting means for detecting and observing the probe pulse transmitted through the analyzing means, and image forming means for forming, on the light detecting means, an image of the probe pulse which has passed through the predetermined region of the detection medium and which is transmitted through the analyzing means, thereby detecting the anisotropy of the refractive index in the light track region and observing the track of light of the excitation pulse.

The above light track observation apparatus uses a pulse light source such as a high-intensity femtosecond laser which is an ultrashort pulse light source. Of two light beams output from this pulse light source, an excitation pulse and probe pulse respectively having predetermined polarized states are generated. The excitation pulse is fed into the detection medium, and the detection medium is irradiated with the probe pulse. The incidence of the excitation pulse forms a region (light track region) in the detection medium in which anisotropy is produced in the refractive index because the refractive index is changed by a nonlinear optical effect in accordance with the track of the excitation pulse.

An image of this light track region is observed by selecting, from the probe pulse which has passed through the detection medium, a component having a changed polarized state by the analyzing means, and detecting this component by the light detecting means. Since the light track region is corresponding to the light track of the excitation pulse entering the detection medium, the light track can be directly observed. Also, the use of a pulse light source such as an ultrashort pulse light source realizes light track observation with high time resolution.

As the detection medium, it is only necessary to select, e.g., a material which can efficiently cause a nonlinear optical effect. It is particularly preferable to use a liquid or gas material which has a high response speed of a nonlinear optical effect. When this light track observation apparatus is used to observe a light track in another apparatus, a predetermined portion of this apparatus as an object through which light passes is used as the detection medium.

BRIEF DESCRIPTION OF DRAWINGS

FIG. 16 is a schematic view for explaining the addition of first information to an excitation pulse in an example of an optical operation; and FIGS. 17A to 17D are schematic views for explaining extraction of the operation result from an observation image in the example of the optical operation.

BEST MODE FOR CARRYING OUT THE INVENTION

Figure 1:
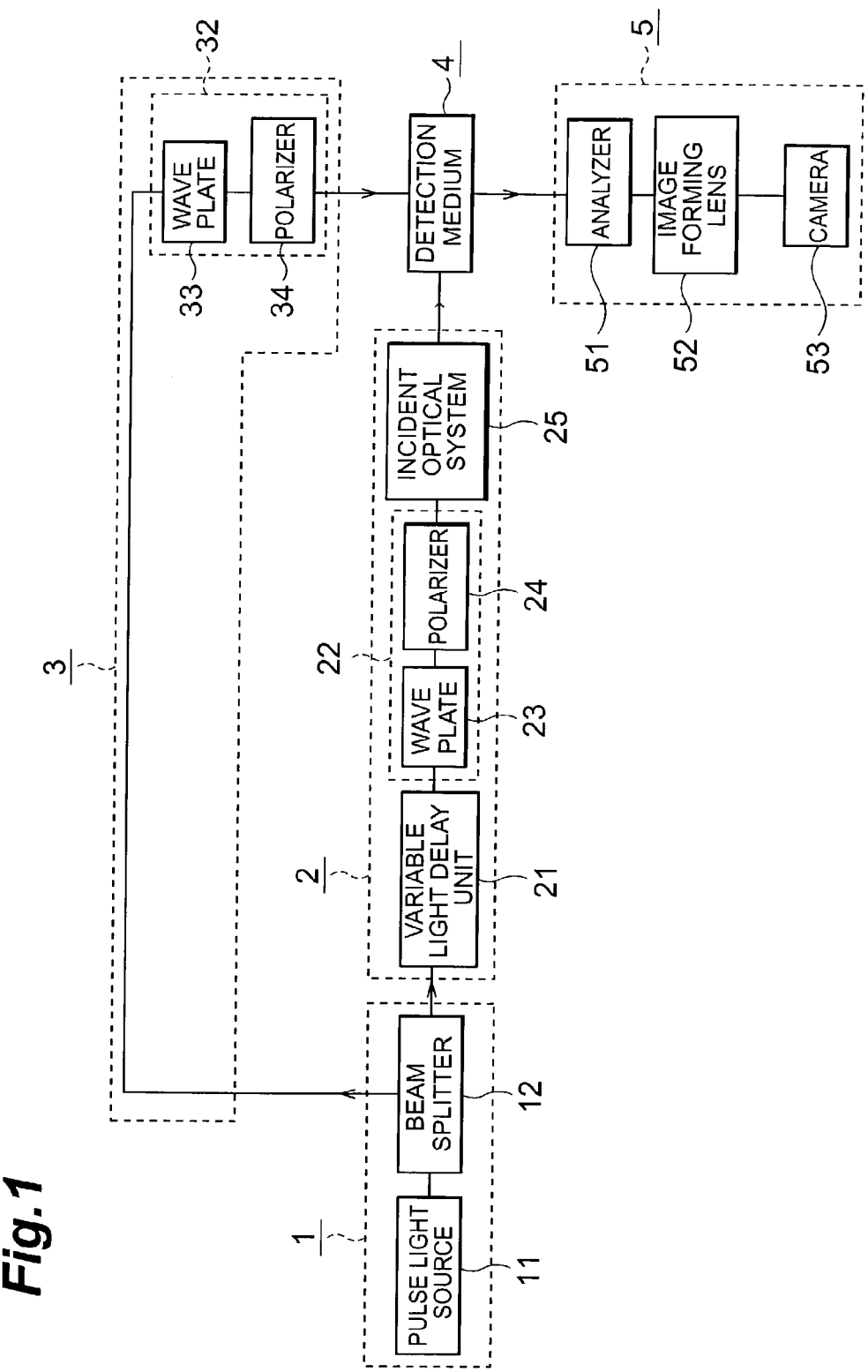
FIG. 1 is block diagram showing the first embodiment of a light track observation apparatus.

Preferred embodiments of a light track observation apparatus according to the present invention will be described in detail below with reference to the accompanying drawings. Note that the same reference numerals in the descriptions of the drawings denote the same parts, and a repetitive explanation thereof will be omitted. Note also that the dimensional ratios in the drawings are not always consistent with the explanation.

FIG. 1 is a block diagram showing the first embodiment of the light track observation apparatus according to the present invention. The light track observation apparatus according to this embodiment comprises a light source part 1, excitation optical system 2, probe optical system 3, detection medium 4, and photodetection part 5.

The light source part 1 includes an ultrashort pulse light source 11 for generating and emitting a light pulse, and a beam splitter 12. The light pulse emitted from the ultrashort pulse light source 11 is split by the beam splitter 12 into a first light beam to be guided to the excitation optical system 2 and a second light beam to be guided to the probe optical system 3.

These first and second light beams output from the light source part 1 are guided as an excitation pulse and probe pulse, respectively, to the detection medium 4. The excitation optical system 2 forms an excitation pulse on the basis of the first light beam from the light source part 1, and feeds this excitation pulse into the detection medium 4 from a predetermined incident axis. This excitation optical system 2 includes a variable light delay unit 21 for setting and changing a delay time difference between the excitation optical system 2 and probe optical system 3, excitation pulse polarizing means 22 having a wave plate 23 and polarizer 24 for setting the excitation pulse into a predetermined polarized state, and incident optical system 25 for feeding the excitation pulse into the detection medium 4 under predetermined incident conditions.

The probe optical system 3 forms a probe pulse on the basis of the second light beam from the light source part 1, and irradiates the detection medium 4 with this probe pulse from a predetermined irradiation axis. This probe optical system 3 has a probe pulse polarizing means 32 which includes a wave plate 33 and polarizer 34 for setting the probe pulse into a predetermined polarized state.

In the above arrangement, the excitation pulse is focused and fed into the detection medium 4 via the excitation optical system 2. The focused excitation pulse forms a large-intensity, high-density light beam in a predetermined region of the detection medium 4. In this region, the refractive index of the detection medium 4 is changed by a nonlinear optical effect such as the optical Kerr effect. This region in which the refractive index is thus changed is corresponding to a spatial region in which the light of the excitation pulse is distributed. This region will be referred to as a light track region hereinafter.

When a predetermined region of the detection medium 4 including this light track region is irradiated with the probe pulse via the probe optical system 3, the anisotropy of the refractive index in the light track region changes the polarized state of only a probe pulse component which has passed through this light track region, with respect to a probe pulse component which has passed through the rest of the detection medium 4. By observing this changed optical component by using the photodetection part 5, an image of the light track region, i.e., the track of the excitation pulse can be observed.

The photodetection part 5 includes an analyzer 51 which transmits only a predetermined polarized component of the probe pulse which has passed through the predetermined region of the detection medium 4, image forming lens 52 for forming an image of the probe pulse component transmitted through the analyzer 51, and camera 53 which is a light detecting means for observing the formed optical image of the probe pulse. That is, the analyzer 51 selectively transmits the probe pulse component which has passed through the light track region, and the camera 53 observes and senses an image of this probe pulse component, thereby observing the track of the excitation pulse.

In the above embodiment, the polarizing means 22 is made up of the wave plate 23 and polarizer 24, and the polarizing means 32 is made up of the wave plate 33 and polarizer 34. However, this is merely an example of the arrangement of these polarizing means 22 and 32. That is, it is also possible to use another arrangement, e.g., an arrangement including only a wave plate, depending on the polarized states of light beams input to the excitation optical system 2 and probe optical system 3, and the polarized states of an excitation pulse and probe pulse to be set.

Also, as an incident optical system in the excitation optical system 2, the incident optical system 25 which feeds an excitation pulse into the detection medium 4 after focusing the pulse is used. However, an optical system which performs no focusing can also be used as this incident optical system, depending on the observation conditions such as the intensity of the excitation pulse and the selection of a material used as the detection medium 4.

Figure 2:
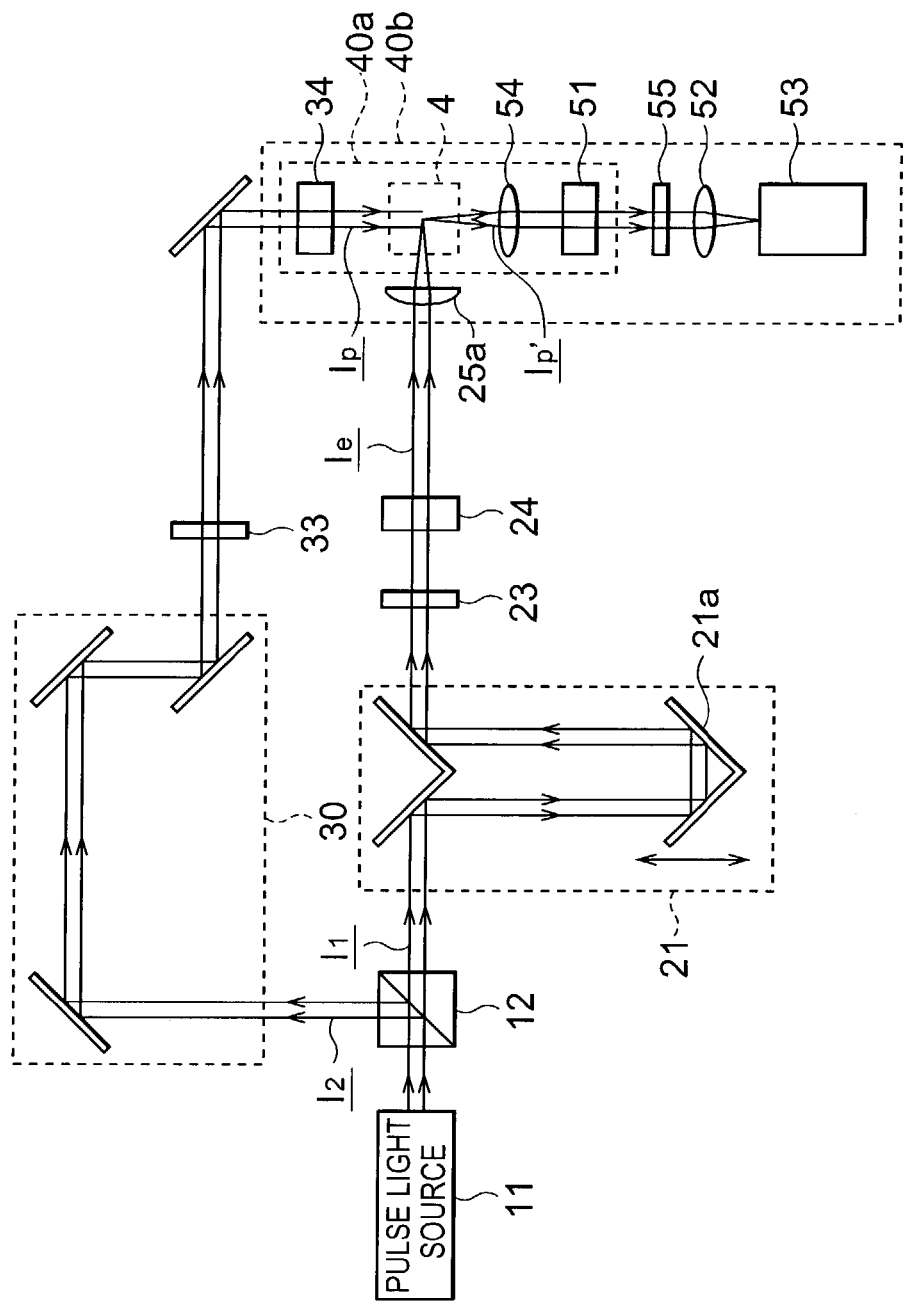
FIG. 2 is a view showing an example of the light track observation apparatus according to the embodiment shown in FIG. 1.

FIG. 2 is a view showing the arrangement of a practical example of the light track observation apparatus according to the embodiment shown in FIG. 1.

In this example, a titanium sapphire laser having a wavelength of 800 nm, a pulse width of 100 fs, and an energy per pulse of 7 mJ is used as an ultrashort pulse light source 11. A light pulse from this pulse light source 11 is split into first and second light beams $l_1$ and $l_2$ by a beam splitter 12 such as a half mirror. This light pulse has linearly polarized light parallel to the plane of the paper of FIG. 2, i.e., a plane (to be referred to as a detection plane hereinafter and described later) including the incident axis of an excitation pulse with respect to a detection medium 4 and the irradiation axis of a probe pulse.

If necessary, a wave plate or the like can be placed between the pulse light source 11 and beam splitter 12. In this case, a prism type polarizing beam splitter, for example, can be used as the beam splitter 12.

The first light beam $l_1$ is guided as an excitation pulse $l_e$ to the detection medium 4 by an excitation optical system. The second light beam 12 is guided as a probe pulse $l_p$ to the detection medium 4 by a probe optical system.

The incident and irradiation timings of the excitation pulse $l_e$ and probe pulse $l_p$ with respect to the detection medium 4 are set or changed by a variable light delay unit 21 in the excitation optical system and an optical path portion 30 in the probe optical system.

This optical path portion 30 in the probe optical system is set and fixed when the apparatus is constructed, and has a function as a light delay unit having a fixed delay time. The optical path portion 30 is used to adjust and set an optical path length difference between the probe optical system and excitation optical system and the initial conditions of a delay time difference produced by this optical path length difference. On the other hand, the variable light delay unit 21 of the excitation optical system has a movable rectangular mirror 21a. The variable light delay unit 21 changes the optical path length by moving this movable rectangular mirror 21a, thereby changing and setting an optical path length difference between the excitation optical system and probe optical system and a delay time difference produced by this optical path length difference.

The polarized state of the excitation pulse $l_e$ is set by a wave plate 23 and polarizer 24 as excitation pulse polarizing means in the excitation optical system. The polarized state of the probe pulse $l_p$ is set by a wave plate 33 and polarizer 34 as probe pulse polarizing means in the probe optical system.

In this embodiment, the wave plate 23 of the excitation pulse polarizing means is a ½-wave plate. The direction of the linearly polarized light of the first light beam $l_1$ which has passed through the variable light delay unit 21 is rotated 90° by this ½-wave plate 23. Consequently, the light beam $l_1$ is converted into linearly polarized light perpendicular to the detection plane. This light beam $l_1$ further passes through the polarizer 24 which transmits only a component having perpendicular linearly polarized light. In this manner, an excitation pulse $l_e$ having linearly polarized light perpendicular to the detection plane is obtained. Note that this polarizer 24 is used to more reliably select a component having perpendicular linearly polarized light, and hence can also be omitted.

The wave plate 33 of the probe pulse polarizing means is a ¼-wave plate. The linearly polarized light of the second light beam $l_2$ which has passed through the optical path portion 30 is converted into circularly polarized light by this ¼-wave plate 33. This light beam $l_2$ further passes through the polarizer 34 which transmits only a component having linearly polarized light inclined 45° to the detection plane. Consequently, the probe pulse $l_p$ having linearly polarized light inclined 45° to the detection plane is obtained. It is also possible to use a ½-wave plate instead of the ¼-wave plate 33, and directly generate and use a probe pulse having linearly polarized light inclined 45°.

The excitation pulse $l_e$ obtained as above is fed into the detection medium 4 by a predetermined incident axis. Also, the detection medium 4 is irradiated with the probe pulse $l_p$ obtained as above by a predetermined irradiation axis. This detection medium 4 is air at room temperature and an atmospheric pressure of 1 atm. However, the whole apparatus is installed in an air atmosphere in the example shown in FIG. 2, so a predetermined region of the air is directly used as the detection medium 4.

The excitation pulse $l_e$ from the excitation optical system passes through a focusing lens 25a which is a plano-convex lens having a focal length of 50 mm, and is focused and fed into the detection medium 4 which is air by a predetermined incident axis. As a consequence, in this detection medium 4 the interaction between the excitation pulse $l_e$ and the air produces a light track region in which a nonlinear optical effect such as the optical Kerr effect occurs. In this light track region, the refractive index of the detection medium 4 changes. In particular, anisotropy in a plane perpendicular to the irradiation axis of the probe pulse $l_p$ is produced in the refractive index.

A predetermined region of the detection medium 4 including this light track region is irradiated with the probe pulse $l_p$ from the probe optical system by an irradiation axis which is perpendicular to the incident axis of the excitation pulse $l_e$. Of this probe pulse $l_p$, a transmitted probe pulse $l_p'$ which is a component transmitted through the detection medium 4 is detected by a photodetection part.

This transmitted probe pulse $l_p'$ enters an analyzer 51 via an objective lens 54. Of the transmitted probe pulse $l_p'$, the analyzer 51 transmits only a linearly polarized light component perpendicular to the linearly polarized light of the probe pulse $l_p$ with which the detection medium 4 is irradiated. Accordingly, that component of the transmitted probe pulse $l_p'$, which is transmitted through a region of the detection medium 4 in which no anisotropy of the refractive index is produced by the nonlinear optical effect is not transmitted through the analyzer 51; only that component of the transmitted probe pulse $l_p'$, which is transmitted through the light track region, and which has the polarized state changed by the anisotropy of the refractive index in the light track region, is transmitted through the analyzer 51.

That is, an optical image of that component of the transmitted probe pulse $l_p'$, which has passed through the analyzer 51 is corresponding to an image of the light track region in which the refractive index is changed by the nonlinear optical effect. Accordingly, this optical image is corresponding to the track of the excitation pulse $l_e$ focused and fed into the detection medium 4.

The optical image of that component of the transmitted probe pulse $l_p'$, which has passed through the analyzer 51 is formed on a CCD camera 53 by an image forming lens 52, and sensed by this CCD camera 53. In this way, the track of the excitation pulse $l_e$ is observed. In this embodiment, the magnification of the objective lens 54 is ×10, and observation is performed by setting the focal point of the camera lens of the CCD camera 53 to infinity. The CCD camera 53 has 640 (horizontal)×480 (vertical) pixels, and 16-bit intensity information can be obtained from it. To reduce the influence of scan lines, this CCD camera 53 is inclined 90° to the detection plane so that the vertical direction of the pixel structure is consistent with the propagation direction (incident axis direction) of the excitation pulse $l_e$ in the detection medium 4. Under the condition, the distance on the observation plane which corresponds to the pixel interval of the CCD camera 53 is 4.8 μm.

In the observation apparatus shown in FIG. 2, the excitation pulse $l_e$ is focused to a very small region in the detection medium 4, and air breaks down accordingly. This generates an air plasma and causes plasma light emission. This plasma light emission is white light having spectral components in a broad band. To eliminate the influence of this light emission, an interference filter 55 which removes a spectral component different from the probe pulse $l_p$ and which has a wavelength of 800 nm is inserted between the analyzer 51 and image forming lens 52.

The same spectral component as the probe pulse $l_p$ was processed as follows. Before track observation, measurement was performed under the same conditions as observation except that no probe pulse $l_p$ was provided. Image data obtained by this measurement was subtracted from image data when the track is observed, thereby selectively observing an optical image of the track by using the transmitted probe pulse $l_p'$. Observation can also be performed under conditions in which the excitation pulse $l_e$ is not accompanied by plasma light emission. In this case, the image data subtraction as described above need not be performed.

The energy per pulse of the excitation pulse $l_e$ was 3.5 mJ immediately before the focusing lens 25a, owing to the loss in each optical element and the like. The track of the excitation pulse $l_e$ was actually measured by using the light track observation apparatus according to the example shown in FIG. 2. This observation was done by further reducing the excitation pulse $l_e$ by an ND filter such that the energy per pulse was 2.3 mJ.

The effects of the light track observation apparatus according to the present invention will be described below together with the results of observation performed by the apparatus and observation conditions according to the example described above. In this light track observation apparatus, an ultrashort pulse laser capable of outputting ultrashort pulse light is used as the pulse light source 11, and this ultrashort pulse is split by the beam splitter 12 to form an excitation pulse $l_e$ and probe pulse $l_p$. By the use of this ultrashort pulse having a very short light pulse time width, light track observation with high time resolution can be performed. Also, since the ultrashort pulse is split, it is possible to synchronize the timings of incidence and irradiation of the excitation pulse $l_e$ and probe pulse $l_p$ with respect to the detection medium 4.

In particular, an image of a light track substantially corresponding to the spatial distribution of light in a specific time of the excitation pulse $l_e$ cannot be directly observed as a two-dimensional image unless a light pulse having a sufficiently short time width such as a pulse width of 100 fs of the ultrashort pulse as in the above embodiment is used. In actual measurement, it was possible to successively acquire data of 48 light tracks at a delay time interval of 66.7 fs, and observe microstructures pertaining to the spatial distribution and propagation state of light in the excitation pulse $l_e$, such as a plurality of light filaments and their changes with time in the track of the light pulse.

Furthermore, in the above embodiment, the excitation optical system 2 includes the variable light delay unit 21 which can change the incident and radiation relative timing of the excitation pulse $l_e$ and probe pulse $l_p$. This timing change is equivalent to a change in the position of the excitation pulse $l_e$ in the incident axis direction when the probe pulse $l_p$ is radiated. Accordingly, by continuously changing the relative timing, a change with time of the track along which the excitation pulse $l_e$ propagates in the detection medium 4 can be observed as a continuous image with high time resolution.

Figure 3:
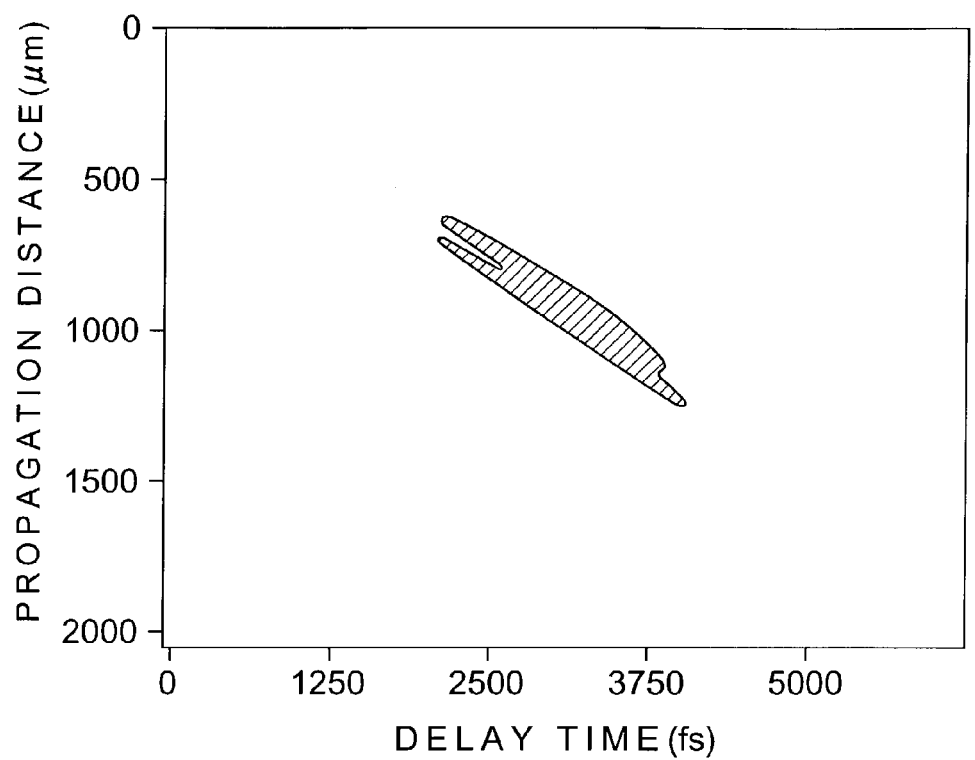
FIG. 3 is a graph schematically showing the movement of the track of light observed by the light track observation apparatus shown in FIG. 2.

FIG. 3 schematically shows the track movement of the excitation pulse $l_e$ observed as above. The abscissa indicates a delay time which is a change in the relative timing of the incidence and radiation of the excitation pulse $l_e$ and probe pulse $l_p$. The ordinate indicates the propagation distance of the excitation pulse $l_e$. Referring to FIG. 3, image data at each delay time is converted from a two-dimensional image obtained by the CCD camera 53 into a one-dimensional image (to be referred to as an arithmetic image hereinafter) in the incident axis direction of the excitation pulse $l_e$, i.e., in the propagation direction of the excitation pulse $l_e$, by adding image data in a direction perpendicular to the incident axis of the excitation pulse $l_e$. This arithmetic image is displayed in the vertical direction of the drawing, and its one-dimensional images at individual delay times are continuously arranged in the horizontal direction, thereby forming an image indicating the track movement (indicated by the hatched portion).

FIG. 3 shows that the way the excitation pulse $l_e$ moves (changes with time) on the propagation axis (incident axis) is clearly observed with high time resolution by the light track observation apparatus according to the present invention. The inclination of the image of this track movement corresponds to the light velocity in the detection medium 4. Also, the horizontal intensity profile near the center is an autocorrelation waveform from which the pulse width can be measured.

The arithmetic image described above corresponds to this autocorrelation waveform if the beam diameter of the excitation pulse $l_e$ is small and does not change largely in the observed light track region, i.e., if the time of interaction with the probe pulse $l_p$ is short and the light excitation density is uniform in the observed light track region, such as when a convex lens having a long focal length is used in the incident optical system of the excitation optical system 2. Also, if the probe pulse $l_p$ has a pulse width much smaller than that of the excitation pulse $l_e$ and has no fine structure, the arithmetic image can be used to measure the light pulse waveform of the excitation pulse $l_e$.

Note that the variable light delay unit 21 as a means for changing the relative timing of the light pulses can also be installed in the probe optical system 3 instead of the excitation optical system 2, or in both the optical systems 2 and 3. Note also that no timing adjusting means such as a variable light delay unit need be used if no change with time need be observed because it is only necessary to observe a light track at a specific timing.

If the delay time is changed when the variable light delay unit as described above is used, the position of the excitation pulse $l_e$ in the propagation axis direction (the position of the observed optical image) during observation changes, and the spatial distribution of the light pulse (the shape of the observed optical image) changes with changes in the light focused state. In contrast, the spatial distribution change of the light pulse can be measured by fixing the delay time without using, e.g., the variable light delay unit 21 in the example shown in FIG. 2, and by using a movable optical system which is movable along the optical axis direction as the focusing lens 25a as an incident optical system, thereby changing the focused state of the excitation pulse $l_e$ at the same observation point in the detection medium 4. In this way, the spatial distribution change can be measured in the same manner as when the variable light delay unit 21 is used.

When this movable focusing lens 25a is used, observation can always be performed at the same timing. Since the observation point remains still, the observation range is not limited by the image sensing range of the CCD camera 53. So, observation can be performed in a broader range of the focused state. Furthermore, the spatial beam pattern of the probe pulse $l_p$ always remains the same, and this improves the accuracy of the obtained image.

In the example shown in FIG. 2, the irradiation axis of the probe pulse $l_p$ has an irradiation angle perpendicular to the incident axis of the excitation pulse $l_e$. However, this irradiation angle need not be 90°. For example, it is also possible to set the irradiation angle between 0° (exclusive) and 90° (exclusive) and perform irradiation while the wavefront of the probe pulse $l_p$ is matched with that of the excitation pulse $l_e$ by a wavefront converting means formed using a diffraction grating or the like. In this case, the time resolution does not deteriorate, and the interaction length between the excitation pulse $l_e$ and probe pulse $l_p$ can be increased.

In the example shown in FIG. 2, air is used as the detection medium 4. However, another material which causes a nonlinear optical effect can also be used as this detection medium 4. In particular, a gas or liquid material is preferably used as the detection medium 4. The response speed of the nonlinear optical effect of a gas or liquid is generally higher than that of a solid, so observation with higher time resolution is possible. For example, $CS_2$ (which is a liquid at room temperature) can be used as a detection medium other than air. In this case, observation can be performed by decreasing the intensity of an excitation pulse, although the response time is longer than that of air.

Preferred conditions of a material used as a detection medium are: (1) have transmittance sufficient for the wavelength of an incident light pulse; (2) have a nonlinear optical effect which largely and rapidly responds with the detection plane of an excitation pulse; (3) do not disturb the polarized state of a probe pulse; (4) have no dispersion which largely changes the pulse width of a probe pulse; and (5) be well resistant to the optical energy of incident light.

As a method of installing a detection medium, the entire apparatus is placed in air as a detection medium in the example shown in FIG. 2. However, various methods other than this installation method are possible. For example, it is also possible to surround, with an enclosure, a region including a predetermined region in which the excitation pulse $l_e$ is incident and the probe pulse $l_p$ is irradiated, and a portion of the rest of the apparatus, and to fill the interior of this enclosure with a detection medium.

The region to be surrounded with an enclosure can be a region 40a or 40b indicated by the dotted line in FIG. 2, or some other region. The material forming at least a portion of this enclosure in which a light pulse is incident, irradiated, or emitted desirably meets the aforementioned preferred conditions for a detection medium.

Figure 4:
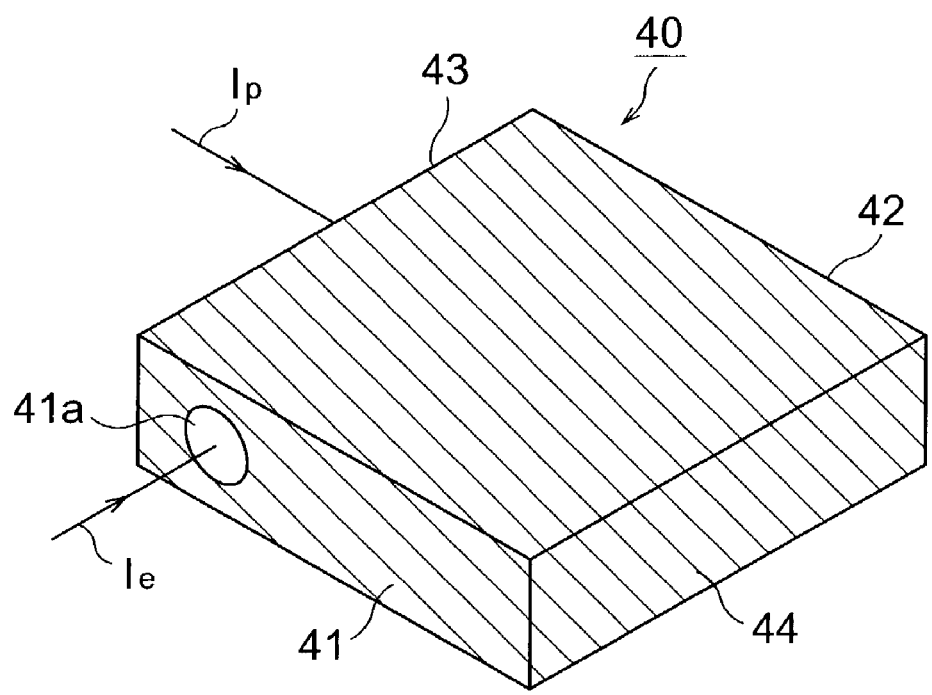
FIG. 4 is a perspective view showing an example of an enclosure used for a detection medium.

FIG. 4 shows an enclosure 40 as an example of the enclosure described above. As shown in FIG. 4, the enclosure 40 is desirably painted in black or the like (the hatched portion in FIG. 4) in order to reduce the influence of background light, except for a portion in which a light pulse is incident, irradiated, or emitted. Also, this portion in which a light pulse is incident, irradiated, or emitted is formed into the shape of a window made of, e.g., quartz glass on both the surfaces of which antireflection films are formed.

This enclosure 40 shown in FIG. 4 is used when the whole photodetection part is contained in the enclosure as in the region 40b shown in FIG. 2, and has an incident window 41a formed in an excitation pulse incident surface 41. A similar irradiation window (not shown) is formed in a probe pulse irradiation surface 43. When a part of the photodetection part is positioned outside the enclosure 40 as in the region 40a shown in FIG. 2, an exit window must also be formed in a probe pulse exit surface 44. If necessary, an exit window can also be formed in an excitation pulse exit surface 42. If property modification of a detection medium during observation is a problem such as when a region in which the enclosure is installed is small, the detection medium is desirably circulated by connecting, e.g., a pump.

When a detection medium is a gas, it is also possible to form an opening, instead of a window, in a portion where a light pulse is incident, irradiated, or emitted. In this case, this gas as a detection medium which is released from the opening must be continuously supplied to the inside of the enclosure from a gas cylinder via a hose or the like.

When a harmless gas is used as a detection medium, this gas can be used as a detection medium without using any enclosure. That is, the output port of a hose connected to a gas cylinder or the like is set in a predetermined position near the region of the detection medium, and the gas is supplied to this region by spraying. Although the purity of the gas slightly deteriorates, execution is easy, and the apparatus is simplified. In addition, no such problems as absorption and reflection of light by the window material arise.

Furthermore, a cell filled with a gas or liquid serving as a detection medium can be installed as a detection medium in the region of the detection medium. This method is particularly suitable when a liquid or a gas such as a toxic gas which is difficult to handle is used. Also, the amount of the detection medium used can be decreased. In this method, a vessel forming the cell desirably meets the aforementioned preferred conditions of a detection medium, similar to the enclosure.

Figure 5A:
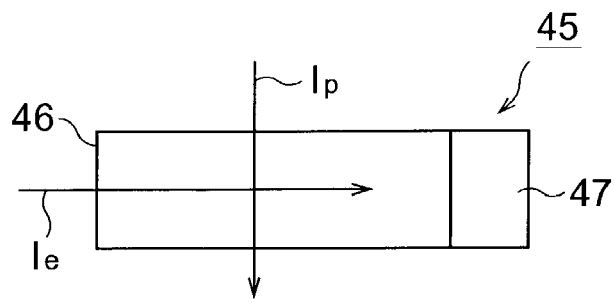
FIGS. 5A and 5B are top and side views, respectively, showing an example of a cell used for a detection medium.
Figure 5B:
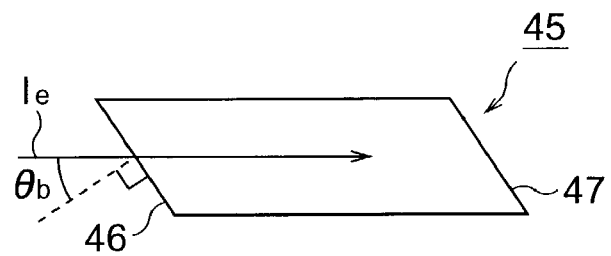

Since the polarizing direction of incident light is determined, the cell is preferably formed as a cell 45, shown in FIGS. 5A and 5B as an example, such that the normal (indicated by the dotted line in FIG. 5B) of an excitation pulse incident surface 46 or excitation pulse exit surface 47 makes a Brewster's angle $\theta_b$ with the optical axis, as shown in a top view (FIG. 5A) and a side view (FIG. 5B) of the cell. This suppresses the reflection and increases the transmittance with the excitation pulse incident surface 46. Also, this improves the accuracy of time resolution with the excitation pulse exit surface 47 by suppressing light which is reflected by the exit end face of the cell to return to the inside of the detection medium. This cell is particularly effective when a liquid which is a detection medium which may produce bubbles is used, since scattering of the reflected light by the bubbles can be prevented.

Especially when a liquid is used as a detection medium while the Brewster's angle is used with respect to the excitation pulse $l_e$ incident and exit surfaces as described above, the traveling direction of the excitation pulse $l_e$ changes because the refractive index of a liquid is largely different from that of air. Therefore, the optical path must be set by taking this into consideration.

Figure 6A:
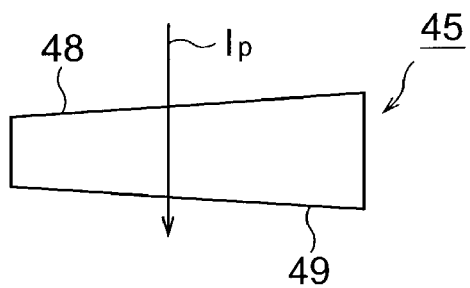
FIGS. 6A and 6B are to top views showing other examples of the cell used for a detection medium.
Figure 6B:
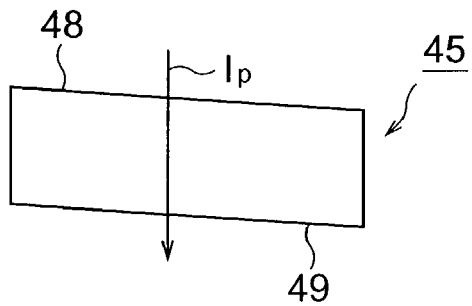

The surfaces of irradiation and exit of the probe pulse $l_p$ are desirably coated with an antireflection film. Also, as examples are shown in top views of FIGS. 6A and 6B, within a range in which the polarized state of the probe pulse $l_p$ is not affected, a probe pulse irradiation surface 48 and probe pulse exit surface 49 can be formed obliquely to the horizontal direction in order to suppress reflection of light, thereby forming a cell into the shape of a trapezoid (FIG. 6A) or parallelogram (FIG. 6B) when viewed from the above. As in the above case, the optical path is set by taking account of a change in the traveling direction of the light pulse.

When a cell is used as described above, two cocks are preferably formed in the upper portion or the like so that a gas or liquid as a detection medium can be appropriately replaced or circulated. As a method of increasing the purity of a detection medium especially when a gas is used as the detection medium, it is possible to first evacuate the cell from one cock, close the cock, and then charge the gas from the other cock. Note that the shape of the cell is not restricted to those described above. That is, various shapes and arrangements can be used in accordance with various conditions, e.g., the energy, polarized state, and optical path of a light pulse.

An example of the conventional apparatus using probe light as described above is an apparatus using E-O crystal described in WO97/45747 or an apparatus described in Phys. Rev. Lett., vol. 80, pp. 5137-5140 (1998). However, the former apparatus measures terahertz (THz) waves, and the latter apparatus measures magnetic fields. That is, these apparatuses are different in both arrangement and function from the light track observation apparatus according to the present invention. In particular, neither of the conventional apparatuses can directly observe a light track.

Figure 7:
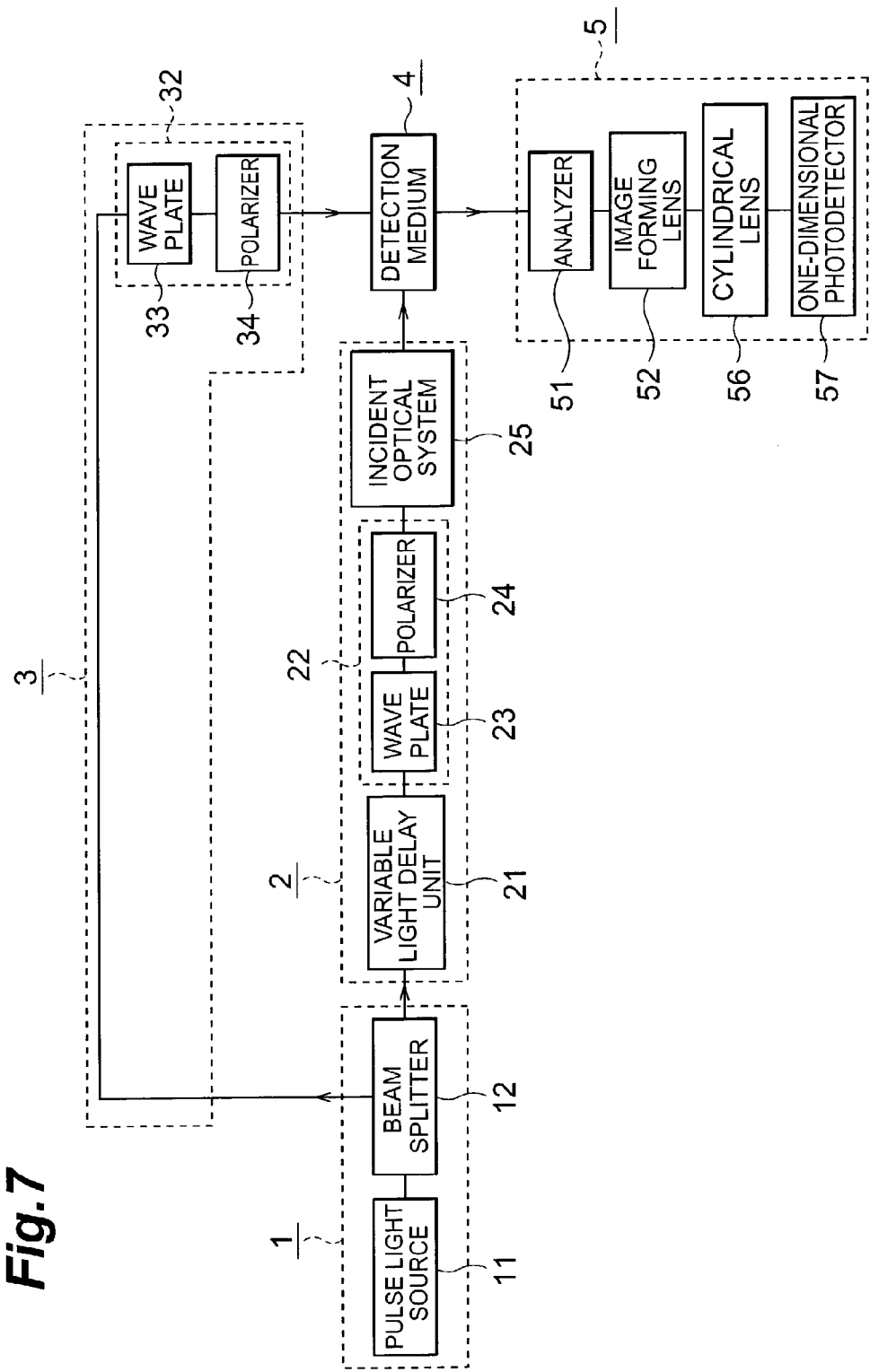
FIG. 7 is a block diagram showing the second embodiment of the light track observation apparatus.

FIG. 7 is a block diagram showing the second embodiment of the light track observation apparatus according to the present invention. A light source part 1, excitation optical system 2, probe optical system 3, and detection medium 4 of the light track observation apparatus of this embodiment are the same as in the first embodiment. In a photodetection part 5, however, a cylindrical lens 56 which is an optical image converting means for converting a two-dimensional optical image of a transmitted probe pulse into a one-dimensional optical image, and one-dimensional photodetector 57 for detecting this one-dimensional optical image generated by the cylindrical lens 56, are positioned after an analyzer 51 and image forming lens 52.

This cylindrical lens 56 is so set as to focus a transmitted probe pulse in a direction perpendicular to the incident axis of an excitation pulse, and form a one-dimensional optical image on the one-dimensional photodetector 57. In this manner, an image of the track movement of light as shown in FIG. 3 can be generated more efficiently.

Figure 8:
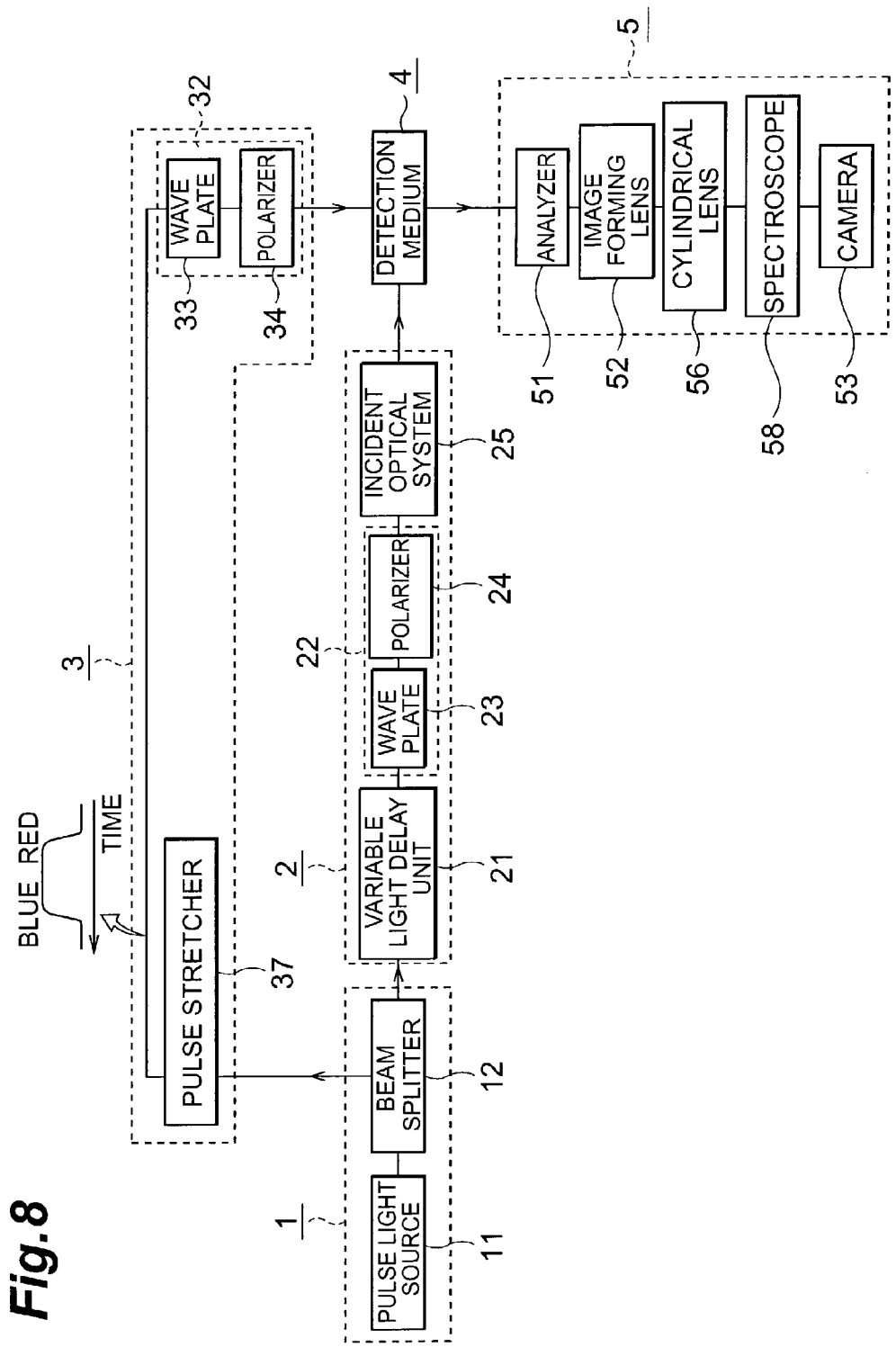
FIG. 8 is a block diagram showing the third embodiment of the light track observation apparatus.

FIG. 8 is a block diagram showing the third embodiment of the light track observation apparatus according to the present invention. A light source part 1, excitation optical system 2, and detection medium 4 of the light track observation apparatus of this embodiment are the same as in the first embodiment. In a photodetection part 5, however, a cylindrical lens 56 is used as an optical image converting means as in the second embodiment, and a spectroscope 58 is placed after this cylindrical lens 56. With this arrangement, a one-dimensional optical image generated by the cylindrical lens 56 is fed into an incident slit of the spectroscope 58 and separated into spectral components. This two-dimensional output image from the spectroscope 58 is observed with a camera 53 by matching the light-receiving surface of this camera 53 with the output image formation position of the spectroscope 58.

As shown in FIG. 8, a pulse stretcher 37 is inserted in a probe optical system 3 to chirp a probe pulse which has passed through this pulse stretcher 37, thereby broadening the pulse width (FIG. 8 shows a wavelength component distribution as a function of the time axis at each point on the optical path). By thus extending the time waveform, each wavelength component of the probe pulse can be related to time information. Note that the pulse stretcher 37 can be made of, e.g., an optical fiber, diffraction grating pair, prism pair, or waveform converting means which is described later.

Figure 9:
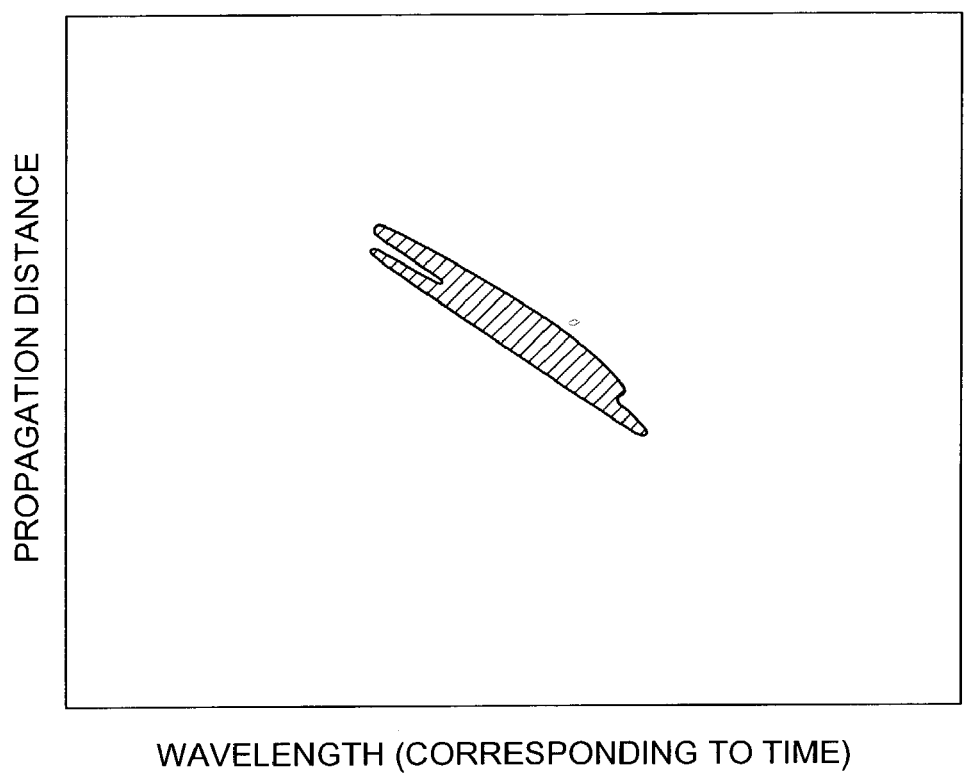
FIG. 9 is a graph showing an optical image observed by the light track observation apparatus shown in FIG. 8.

FIG. 9 shows an example of an observation image obtained by using the above arrangement. The abscissa indicates the wavelength which corresponds to the time axis as described above. Therefore, a graph as shown in FIG. 9 which is substantially equivalent to FIG. 3 can be observed by performing measurement once. To improve the measurement accuracy, it is preferable to acquire the spectrum of a probe pulse beforehand and, e.g., filter the obtained observation image.

Figure 10:
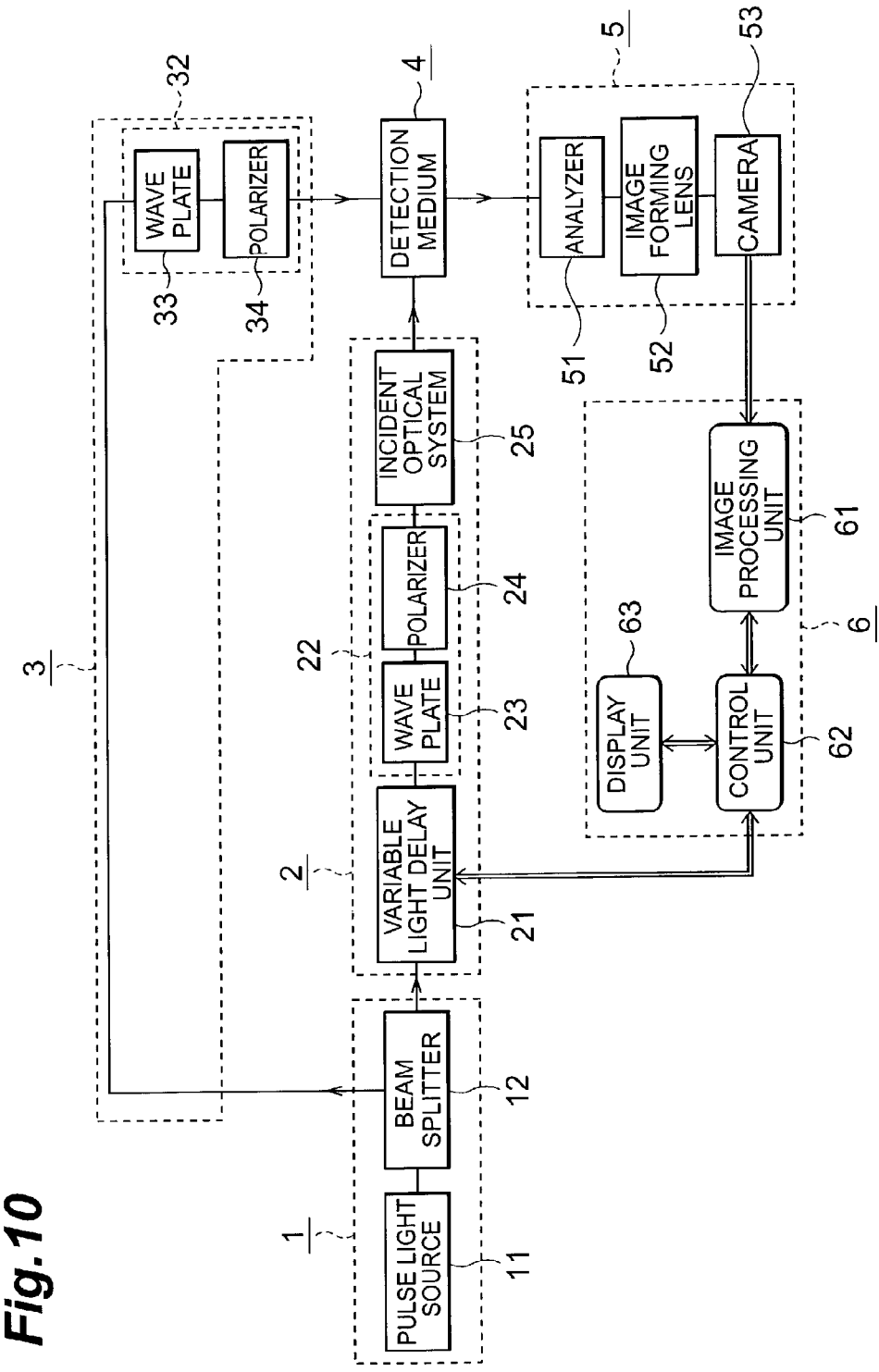
FIG. 10 is a block diagram showing the fourth embodiment of the light track observation apparatus.

FIG. 10 is a block diagram showing the fourth embodiment of the light track observation apparatus according to the present invention. The arrangement of the light track observation apparatus according to this embodiment is the same as the first embodiment, except that a controller 6 for controlling individual units and performing calculations for image data is added. This controller 6 includes an image processing unit 61, control unit 62, and display unit 63.

The image processing unit 61 is connected to a CCD camera 53. This image processing unit 61 arranges and analyzes observation images sensed by the CCD camera 53, and performs necessary calculations. For example, the subtraction of image data when the probe pulse is radiated or not radiated described previously in the example shown in FIG. 2, and the formation of the graph shown in FIG. 3 can be performed by analyzing image data acquired by the CCD camera 53. In contrast, when the CCD camera 53 is connected to the image processing unit 61 as shown in FIG. 10, image processing as described above can be performed in real time during observation.

This image processing unit 61 is further connected to the control unit 62 for controlling the whole apparatus. For example, this control unit 62 acquires image data via the image processing unit 61, and displays the obtained data on the display unit 63. The control unit 62 is connected to a variable light delay unit 21, and can control the delay time in correlation with observation. If necessary, the control unit 62 can also be connected to a pulse light source 11 and the like.

According to the results of observation, in the apparatus shown in FIG. 2, the intensity of a transmitted probe pulse is substantially proportional to the square of the intensity of an excitation pulse and can be observed primarily by the optical Kerr effect caused in the detection medium 4. Image data of the obtained observation image corresponds to the square distribution of the excitation pulse intensity. Accordingly, an observation image which more accurately reflects the spatial distribution of the intensity of a light pulse can be obtained by calculating the square root of the intensity of image data of each pixel or performing calculation such as $\arcsin^2$ in the image processing unit 61 described above.

Figure 11:
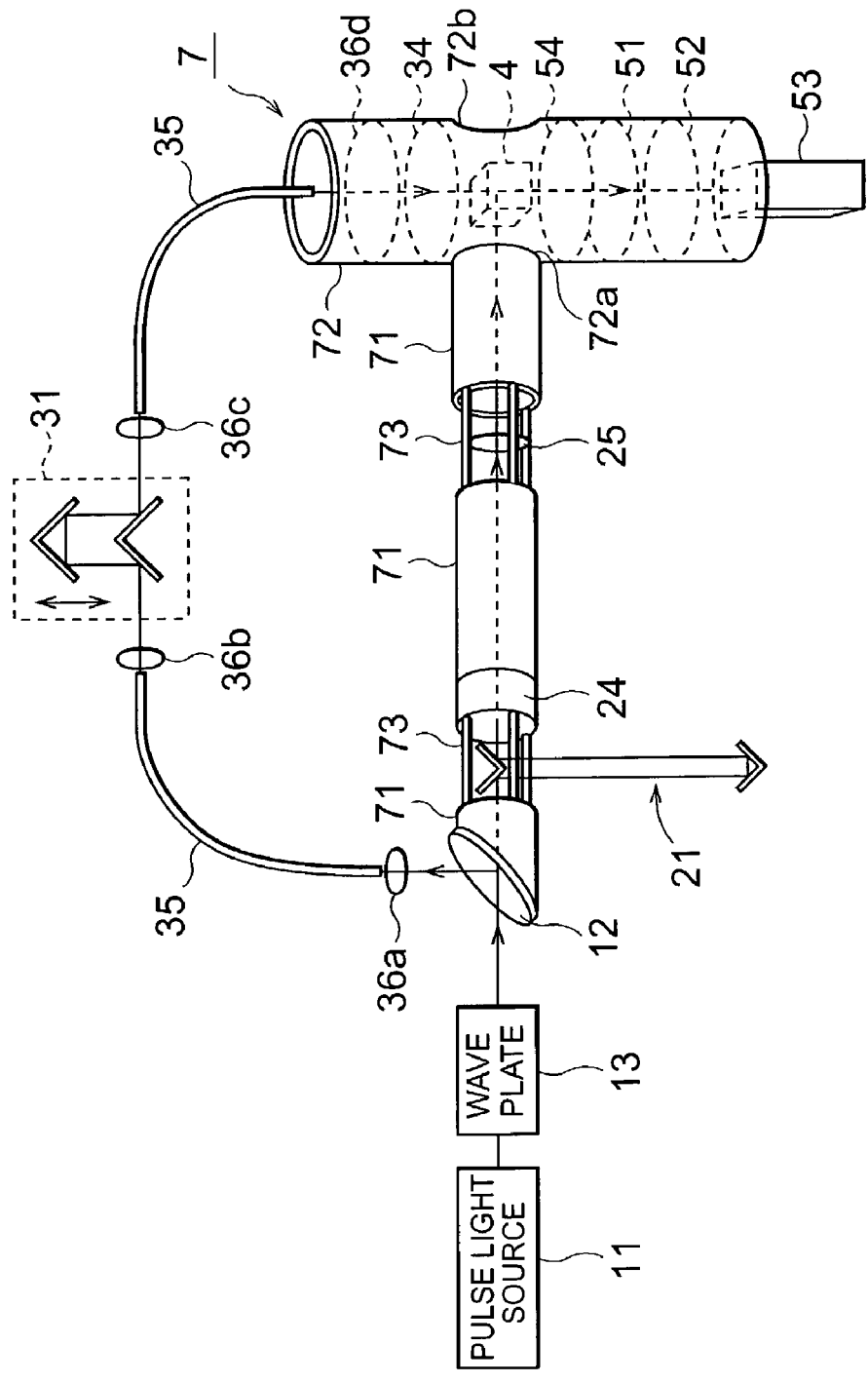
FIG. 11 is a block diagram showing the fifth embodiment of the light track observation apparatus.

FIG. 11 is a block diagram showing the fifth embodiment of the light track observation apparatus according to the present invention. In the light track observation apparatus of this embodiment, individual parts are integrated and held by a T-shaped optical system holding mechanism 7. This optical system holding mechanism 7 is made up of a cylindrical excitation optical system holding unit 71 which is positioned around the incident axis of an excitation pulse, and holds an excitation optical system, and cylindrical probe optical system holding unit 72 which is positioned around the irradiation axis of a probe pulse, and holds part of a probe optical system and a photodetection part.

In this embodiment, a ¼-wave plate 13 is placed between a pulse light source 11 and beam splitter 12. First and second light beams split by the beam splitter 12 have circularly polarized light. In contrast, an excitation pulse polarizing means and probe pulse polarizing means include only polarizers 24 and 34, respectively, so the linearly polarized states of an excitation pulse and probe pulse are selected.

The excitation optical system holding unit 71 is divided into a plurality of cylindrical portions, and a light delay unit 21, the polarizer 24, and an incident optical system 25 are fixed between these cylindrical portions. Since the excitation optical system holding unit 71 is thus divided and the optical elements are arranged between the divided portions, these optical elements can be easily replaced, and the optical path of the light delay unit 21 is not blocked. The individual parts of this excitation optical system holding unit 71 are connected and integrated by a connecting unit 73.

A detection medium 4 is placed in a central portion of the probe optical system holding unit 72, and an opening 72a is formed in a predetermined portion facing this detection medium 4. The excitation optical system holding unit 71 is connected to this opening 72a to feed an excitation pulse into the detection medium 4. An opening 72b is formed in a portion opposing the opening 72a. Also, the polarizer 34 of the probe optical system is held in the upper portion of the probe optical system holding unit 72.

In this embodiment, an optical fiber 35 is used as the optical path of the probe optical system, and a variable light delay unit 31 for the optical fiber is placed midway along this optical path. In addition, condenser lenses 36a and 36c and collimating lenses 36b and 36d are arranged for incidence and exit of light to and from the optical fiber 35.

When an optical fiber is used as described above, the pulse width of a probe pulse is broadened by dispersion of the optical fiber, and this deteriorates the time resolution of track observation. Therefore, it is desirable to correct this broadening of the pulse width by using, e.g., a dispersion shift fiber, grating fiber, diffraction grating pair, or prism pair, thereby forming a light pulse having a small pulse width in the detection medium 4.

Elements of the photodetection part, i.e., an objective lens 54, analyzer 51, image forming lens 52, and CCD camera 53 are held in the lower portion of the probe optical system holding unit 72.

This optical system holding mechanism 7 and the optical elements of the optical systems fixed and held by it can rotate around the incident axis of an excitation pulse. With this arrangement, the track of light in the detection medium 4 can be observed at different angles. Accordingly, three-dimensional information such as information of an optical section concerning the spatial distribution of light in a specific delay time can be obtained by using, e.g., an image reconstruction method similar to X-ray CT.

Figure 12:
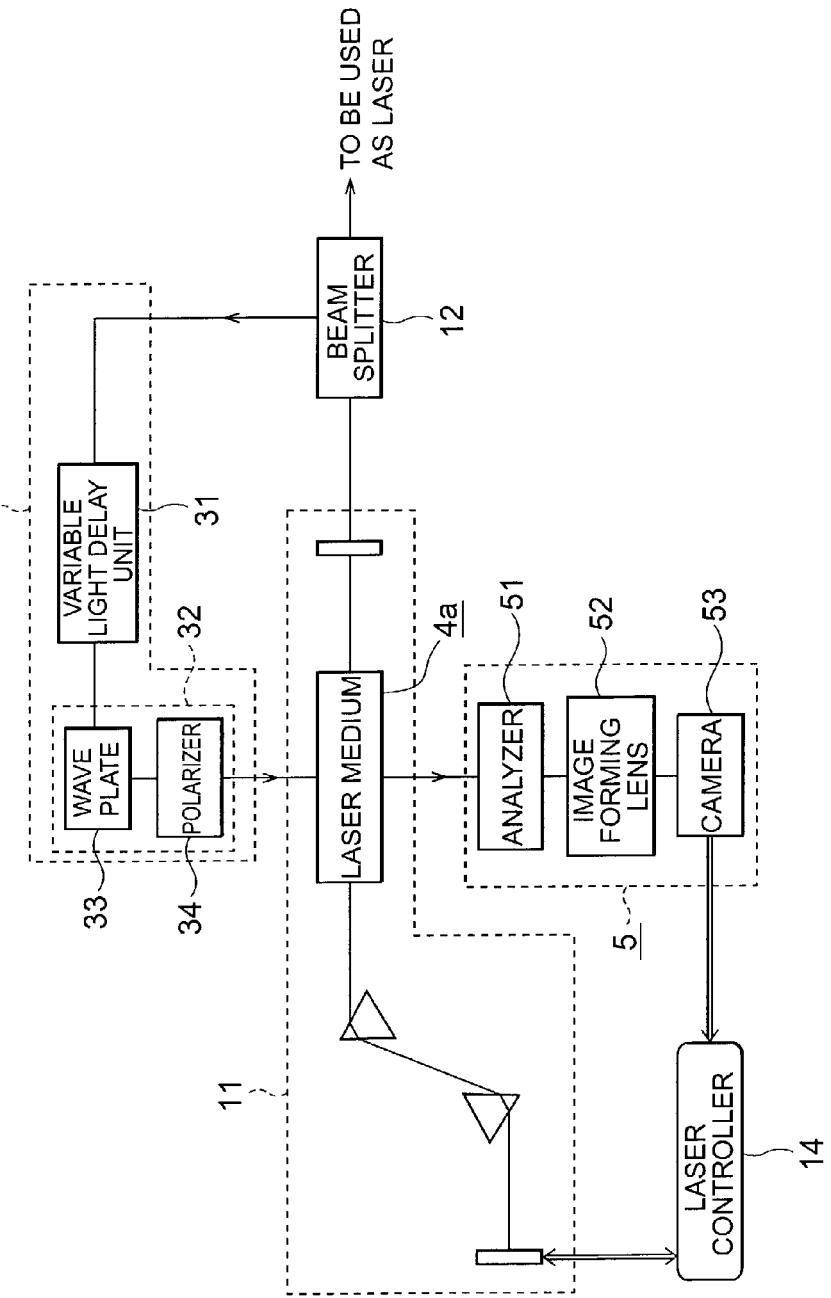
FIG. 12 is a block diagram showing the sixth embodiment of the light track observation apparatus.

FIG. 12 is a block diagram showing the sixth embodiment of the light track observation apparatus according to the present invention. In the light track observation apparatus according to this embodiment, a laser medium 4a of a pulse light source 11 which is an ultrashort pulse laser used as a light source is a detection medium. In this arrangement, an excitation pulse is a light pulse present in a laser resonator of this pulse light source 11. A probe pulse is a laser pulse output from the pulse light source 11 and split by a beam splitter 12.

With this arrangement, information pertaining to the state of a light pulse in the laser resonator can be obtained from an observation image obtained by a camera 53. By feeding this information back to the laser via a laser controller 14, the pulse laser can be optimized and stabilized. This observation can also be performed by using a dispersion compensating prism as a detection medium.

This embodiment having a laser as its object is merely an example of the use of the light track observation apparatus according to the present invention. Therefore, the embodiment is also applicable to various devices in addition to a laser. When the polarized state of light in the laser medium 4a is taken into consideration, the two prisms shown in FIG. 12 are desirably arranged perpendicular to the plane of the paper.

Figure 13:
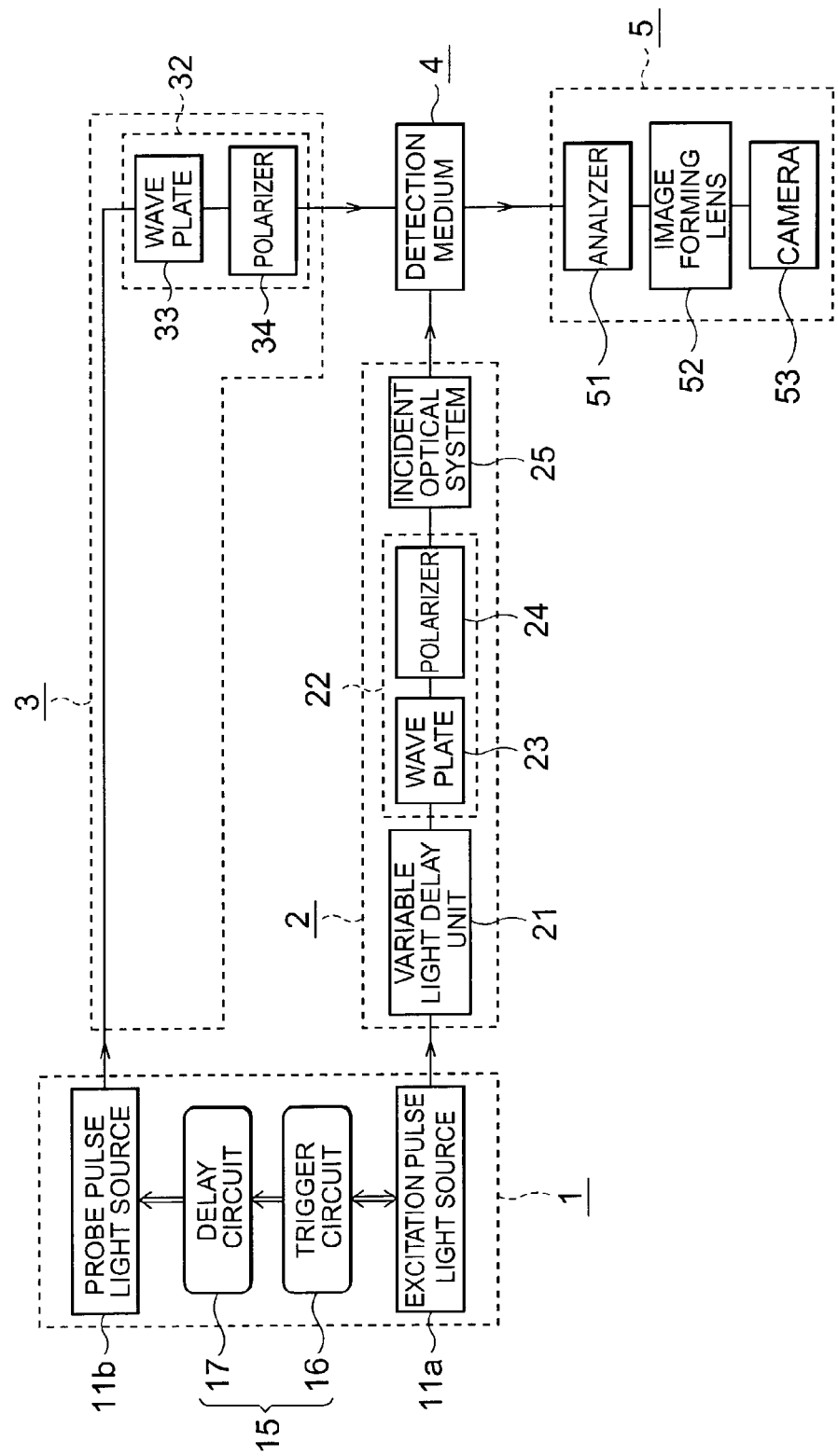
FIG. 13 is a block diagram showing the seventh embodiment of the light track observation apparatus.

FIG. 13 is a block diagram showing the seventh embodiment of the light track observation apparatus according to the present invention. In this embodiment, a light source part 1 is not a single pulse light source. That is, an excitation pulse light source 11a and probe pulse light source 11b are used for an excitation pulse and probe pulse, respectively.

The timing of a probe pulse with respect to an excitation pulse is controlled by a timing control circuit 15 in addition to a variable light delay unit 21. This timing control circuit 15 is made up of a trigger circuit 16 and delay circuit 17. With this arrangement, the timing control circuit 15 can synchronize the two pulses and can set and change the delay time difference. In this case, both an excitation optical system 2 and probe optical system 3 need not have a variable light delay unit.

When two light sources are used as described above, the pulse widths or wavelengths of an excitation pulse and probe pulse can be made different from each other. In particular, measurement with further high time resolution can be performed by selecting the probe pulse light source 11b so as to further shorten the pulse width of a probe pulse with respect to that of an excitation pulse.

The light track observation apparatus according to the present invention is not limited to the above-mentioned embodiments and examples, and various modifications are possible. For example, on the optical path of the excitation optical system or probe optical system, a wavelength converting means for changing the wavelength of an excitation pulse or probe pulse can be set. By using this wavelength converting means in the excitation optical system, light tracks when light components having different wavelengths enter a detection medium can be observed.

Also, by using the wavelength converting means in the probe optical system, the wavelengths of an excitation pulse and probe pulse can be made different from each other. If laser plasma emission occurs in a detection medium, for example, the efficiency of observation can be improved by converting the wavelength of a probe pulse into a wavelength which is not easily absorbed or scattered by the plasma. Examples of this wavelength converting means is an optical parametric amplifier, sum-difference frequency generator, and SHG crystal.

On the optical path of the excitation optical system or probe optical system, a time waveform converting means for changing, e.g., the time waveform of an excitation pulse or probe pulse can also be set to observe the tracks of light pulses by using various time waveforms. This time waveform converting means changes the waveform of each individual light pulse or changes the arrangement of a pulse string. It is possible to use various means such as disclosed in Japanese Patent Application Laid-open No. H10-206234 in accordance with purposes.

Figure 14:
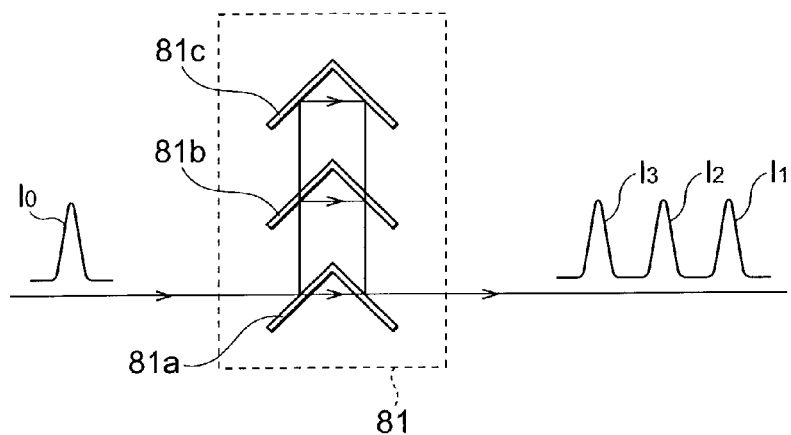
FIG. 14 is a view showing a pulse string generator as an example of a time waveform converting means.

FIG. 14 shows the arrangement of a pulse string generator 81 as an example of this time waveform converting means. This pulse string generator 81 is made up of two right-angled beam splitters 81a and 81b and a total reflection mirror 81c which is a right-angled mirror. With this arrangement, from a light pulse $l_0$ input to the pulse string generator 81, a pulse string is generated which has a time waveform including three light pulses, e.g., a light pulse $l_1$ output directly through the beam splitter 81a, a light pulse $l_2$ output after being reflected by the beam splitter 81b, and a light pulse $l_3$ output after being reflected by the total reflection mirror 81c.

The number of light pulses forming a pulse string generated by the pulse string generator having the above arrangement can be set by the number of beam splitters used or the like. Also, the pulse time interval of each light pulse can be freely set by setting, e.g., the optical path length of each optical path in accordance with the positional relationship such as the installation intervals between the beam splitters and total reflection mirror.

Furthermore, the time interval of a light pulse can be made variable by making the optical path length variable by using movable beam splitters and a movable total reflection mirror. This makes it possible to change the conditions of a pulse string. The intensity ratio of light pulses can also be freely set by setting the splitting ratio of the beam splitters or the like. Referring to FIG. 14, the intensities of the three light pulses are equal.

Instead of the pulse string generator including the beam splitters and total reflection mirror shown in FIG. 14, it is possible to use, e.g., a modification of a Michelson interferometer, Mach-Zehnder interferometer, Fabry-Pérot interferometer, or Fizeau interferometer, or an etalon.

Various measurements are possible by applying the time waveform converting means to an excitation pulse or probe pulse. For example, by applying the pulse string generator described above to the probe optical system 3 of the light track observation apparatus shown in FIG. 1 or 2, a probe pulse can be converted into a pulse string made up of a plurality of light pulses, e.g., a pulse string made up of three light pulses having a pulse width of 0.1 ps, pulse interval of 1 ps, and equal intensity. This makes it possible to simultaneously acquire three observation images with high time resolution by performing observation once, i.e., to simultaneously acquire three observation images observed at intervals determined by the pulse time interval, along the excitation pulse propagation axis as a time axis.

Also, by applying the pulse string generator to the excitation optical system 2, an excitation pulse can be converted into two light pulses having a pulse width of 0.1 ps, pulse interval of 0.5 ps, and intensity ratio of 5:1=first pulse: second pulse. In a laser plasma generated in the detection medium 4 by incidence and propagation of the first pulse (pre-pulse) having an intensity of 5, the second pulse (after-pulse) having an intensity of 1 is allowed to propagate with a delay of 0.5 ps. By observing the track of the light, the propagation state can be observed with the laser plasma generated. The propagation state of light can also be checked under various other conditions.

While the pulse string generator is applied to the excitation optical system 2 as described above, the pulse string generator can also be applied to the probe optical system 3 to convert a probe pulse into a pulse string made up of three light pulses having a pulse width of 0.1 ps, pulse interval of 5 ps, and equal intensity, thereby acquiring three high-time-resolution observation images for each of the above-mentioned first and second light pulses of an excitation pulse, i.e., a total of six high-time-resolution observation images at the same time. In this manner, it is possible to efficiently observe the generation of a plasma and the propagation of light in the generated plasma. It is also possible to check, e.g., changes in response by the waveform by using a time waveform converting means, such as a means for converting the time waveforms of individual light pulses, other than the pulse string generator.

The time waveform converting means described above relates to the time waveform of a light pulse. However, the light tracks of light pulses in various spatial distributions can also be observed by setting a spatial distribution converting means for changing the spatial distribution or the like of an excitation pulse or probe pulse on the optical path of the excitation optical system or probe optical system. An example of this spatial distribution converting means is a slit mask having one or a plurality of slits having a predetermined shape. This slit mask converts the spatial distribution of an excitation pulse or probe pulse into one or a plurality of slit-shaped distributions through the slit or slits.

In light track observation using an excitation pulse and probe pulse, an observation image is acquired as superposition of the spatial light intensity distribution (spatial distribution) of the excitation pulse and the response and response distribution of a medium in the detection medium 4. This superposition of the two is sometimes a problem depending on various conditions such as the time resolution required in the observation.

To prevent this, a slit mask is set as a spatial distribution converting means in the excitation optical system 2. For example, a slit mask having one slit with a predetermined width, e.g., 2 mm, is set in front of the focusing lens 25a in FIG. 2, such that the longitudinal direction of this slit mask is a direction perpendicular to the plane of the paper of FIG. 2 (i.e., in a direction perpendicular to the incident axis of an excitation pulse and detection plane). With this arrangement, the spatial distribution width of an excitation pulse in the irradiation axis direction of a probe pulse is limited through the slit and decreased. This shortens the time during which the probe pulse passes through the region of the excitation pulse and the two pulses interact with each other.

Figure 15A:
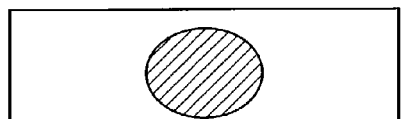
FIGS. 15A to 15D are views schematically showing observation images when a slit mask is used for an excitation pulse.
Figure 15B:
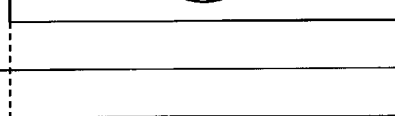

FIGS. 15A to 15D schematically illustrate changes in an observation image when the slit mask is used. In each of FIGS. 15A to 15D, the abscissa is the propagation axis (time axis) of an excitation pulse. FIG. 15A shows an observation image of a light track when no spatial distribution converting means such as the slit mask is used. FIG. 15B shows the shape of an observation image when the slit mask having one slit as described above is set in the excitation optical system such that the longitudinal direction of the slit is the vertical direction.

In this case, the passing time of a probe pulse shortens as described above, so the propagation distance of an excitation pulse during interaction shortens accordingly. In an observation image, therefore, as shown in FIG. 15B, the spatial distribution width of the excitation pulse in the propagation axis (time axis) direction is limited and shortened. This allows measurement in which the response of a medium in the detection medium 4 is extracted as a characteristic feature. Accordingly, the response time of the medium and the like can be detected by measurement with higher time resolution. Furthermore, light track observation can be accurately performed by using this information in the observation and its data processing and the like.

Figure 15C:
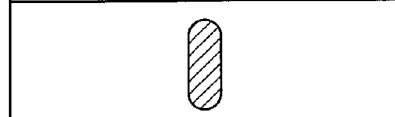

Instead of the setting direction described above, the slit mask can be set such that the longitudinal direction of the slit is a direction parallel to the plane of the paper of FIG. 2 (i.e., in a direction perpendicular to the incident axis of an excitation pulse and parallel to its detection plane). Observation with a limited spatial distribution can be performed even in this case. As shown in FIG. 15C, in the obtained observation image the vertical spatial distribution width is limited and shortened.

Figure 15D:
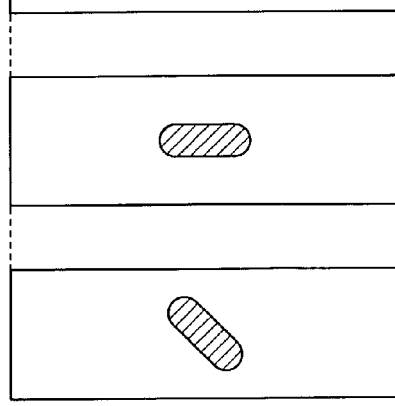

When the longitudinal direction of the slit has a predetermined inclination angle, e.g., 45°, the position in the vertical direction of a interacting light pulse portion of an excitation pulse moves with time while a probe pulse passes through the region of the excitation pulse. Accordingly, the obtained observation image is an oblique image as shown in FIG. 15D. This allows measurement which effectively discriminates the spatial distribution while maintaining the same time resolution as when the slit is in the vertical direction.

Furthermore, the angle in the longitudinal direction of the slit of the slit mask can also be set and changed by using an angle changing mechanism. Consequently, it is possible to set a necessary spatial distribution shape by appropriately changing the set direction and angle of the slit, and to perform observation for acquiring various pieces of information matching this spatial distribution without, e.g., replacing the split mask.

The spatial distribution converting means is not restricted to the above-mentioned slit mask which forms a slit-like spatial distribution, and it is possible to use various means in accordance with purposes. As an example, an arbitrary spatial distribution can be formed by using a spatial light modulator or the like. Also, the spatial distribution converting means is applied to an excitation pulse in the above example. However, the spatial distribution converting means is also applicable to a probe pulse or both an excitation pulse and probe pulse.

When the time waveform and spatial distribution of an excitation pulse or probe pulse are converted by using the time waveform converting means and spatial distribution converting means described above and thereby predetermined structures are given to these light pulses, various observations can be performed by using these structures. For example, when a first structure is given to at least one of the time waveform and spatial distribution of an excitation pulse and a second structure is given to at least one of the time waveform and spatial distribution of a probe pulse, observation which extracts a third structure formed in an observation image on the basis of the first and second structures can be performed by light track observation using the excitation pulse and probe pulse.

Accordingly, various measurement methods can be used in accordance with purposes. For example, the aforementioned structures of the light pulses and observation image can be matched with information such as numerical value information by respective predetermined matching methods. In this case, by using the process in which an observation image is obtained by forming an optical image by the interaction between an excitation pulse and probe pulse with the detection medium 4, an operation (to be referred to as an optical operation hereinafter) can be performed from information of the two pulses.

That is, first information (a first structure) is added to an excitation pulse, second information (a second structure) is added to a probe pulse, and a specific optical operation (observation) is performed via the interaction between these excitation pulse and probe pulse. As the operation result (observation result), third information (a third structure) can be extracted from the observation image. The information (structure) to be added to each light pulse can be added by using one or both of the time waveform and spatial distribution.

An example of an optical operation performed by the addition of information (structure) to each light pulse and light track observation will be explained below with reference FIGS. 16 and 17A to 17D. For the sake of descriptive simplicity, assume that this optical operation (observation) is performed in a system having no condenser lens.

Figures 16, 17D:
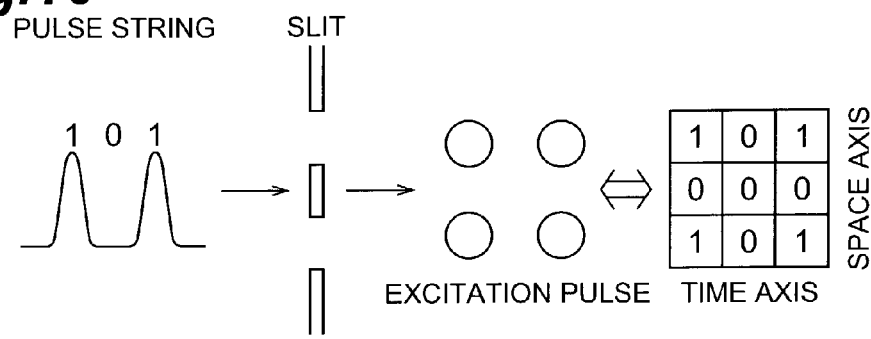

FIG. 16 shows the addition of information (first information) to an excitation pulse in this example. As indicated by an excitation pulse before passing through the slit on the left-hand side of FIG. 16, an excitation pulse is a double pulse having a pulse width of 0.1 ps, pulse interval of 0.6 ps, and equal intensity, and information of (1,0,1) is added to the time waveform along the time axis. Also, information (1,0,1) is added to the spatial distribution along the space axis by a double slit having an equal slit width. Consequently, numerical value information 1,0,1
0,0,0
1,0,1 is added to the excitation pulse. This numerical value information has a matrix of three rows and three columns (a total of nine numerical values) shown on the right-hand side of FIG. 16 in relation to the excitation pulse which has passed the slit. The abscissa indicates the time axis of an observation image, and the ordinate indicates the space axis.

On the other hand, a probe pulse is a double pulse having a pulse width of 0.1 ps, pulse interval of 0.6 ps, and equal intensity, and information (second information) of (1,0,1) is added to the time waveform along the time axis similar to the excitation pulse. However, no information is added to the spatial distribution without performing any conversion.

A slit mask having a double slit applied to an excitation pulse is set such that the longitudinal direction of the slit is a horizontal direction (a direction parallel to the irradiation direction of a probe pulse, similar to the case shown in FIG. 15C). In this case, the excitation pulse divided into four light pulse portions and the corresponding 3×3 matrix as shown in FIG. 16 are obtained when this excitation pulse is viewed in the irradiation axis direction of the probe pulse. This excitation pulse is irradiated with the probe pulse as a double pulse along the irradiation axis perpendicular to the plane of the paper.

Assume that for each of the excitation pulse and probe pulse, the leading, earlier light pulse component on the incident axis or irradiation axis (corresponding to the time axis) is a first pulse, the trailing, later light pulse component is a second pulse. However, each of the first and second excitation pulses is a combination of two pulse components spatially divided by the double slit.

FIGS. 17A to 17D illustrate the structure (third structure) of an observation image obtained by light track observation performed in the detection medium 4 by using light pulses generated under the above conditions as input data, an optical operation executed by relating the structure to information, and output data as the operation result. In each of FIGS. 17A to 17C, the abscissa is the propagation axis (time axis) of an excitation pulse.

An image of an excitation pulse is observed twice as an image obtained by a first probe pulse radiated earlier and as an image obtained by a second probe pulse radiated later. FIGS. 17A and 17B schematically show these images obtained by the two probe pulses, respectively.

As described above, the pulse time interval between first and second excitation pulses and the pulse time interval between first and second probe pulses are set to be equal. Therefore, an image is formed and observed such that the positions of the first excitation pulses (two pulses on the right-hand side of FIG. 17A) in the front portion of the image obtained by the first probe pulse shown in FIG. 17A match the positions of the second excitation pulses (two pulses on the left-hand side of FIG. 17B) in the rear portion of the image obtained by the second probe pulse shown in FIG. 17B.

As shown in FIG. 17C, the obtained observation image has a third structure formed by superposing the two images described above. This third structure includes three optical images in the propagation direction and two optical images in a direction perpendicular to the propagation direction, i.e., 2×3=6 optical images. Of these optical images, two images in the center of the propagation axis direction are observed with intensity twice that of the other optical images, owing to superposition of images by the first and second probe pulses. In this manner, observation images having various structures can be observed by giving structures to an excitation pulse and probe pulse.

The third structure (intensity distribution) of the optical image of the above observation image is matched with information, and third information is extracted as output data of the result of an optical operation. In this case, numerical information 1,0,2,0,1
0,0,0,0,0
1,0,2,0,1 which is a matrix having three rows and five columns (a total of 15 numerical values) shown in FIG. 17D below FIG. 17C in relation to the observation image can be obtained as the operation result.

The relationship between the numerical value and optical intensity in information of each of the first and second structures of input data and the third structure of output data is relatively determined. Accordingly, it is unnecessary to match optical intensity corresponding to 1 as numerical information added as input data to an excitation pulse, optical intensity corresponding to 1 as numerical information added as input data to a probe pulse, and optical intensity corresponding to 1 as numerical information obtained as output data from an observation image.

The type of optical operation and the result of the operation can be variously changed in accordance with the arrangement of each light pulse and the like. For example, by forming the probe pulse spatial distribution into a spatial distribution from which a ⅖ left-hand portion is removed by limitation in FIGS. 17A to 17C, a matrix 2,0,1
0,0,0
2,0,1 having three rows and three columns (a total of nine numerical values) can be obtained as the operation result.

As described above, by adding structures and information to an excitation pulse and probe pulse, and extracting information as an operation result from an observation image generated from these pulses via a detection medium, an operation (optical operation) using light pulses can be executed in relation to a specific operation. This optical operation can be performed at high speed in a femtosecond region in accordance with its operation method.

Operations executable by an optical operation are not limited to digital operations as in the above example. That is, any operation meeting the purpose can be performed by freely changing the time waveform or spatial distribution. Also, the contents of the operation can be set by, e.g., the time waveform and spatial distribution of each of an excitation pulse and probe pulse, and the incident timing and irradiation timing of the these pulses.

Assume, for example, that the first probe pulse of the double probe pulse in the above example is transmitted through a certain material as a sample. Assume also that the second probe pulse of the double probe pulse is transmitted through the sample material excited by another single excitation pulse synchronized with the excitation pulse. In this case, the light transmission characteristic when the sample material is not excited and that when the sample material is excited can be reflected on the first and second probe pulses, respectively, and the difference can be efficiently extracted by a suitable operation. In this way, it is possible to efficiently extract and observe information which rapidly changes as a result of optical interaction such as excitation of a material or light stimulus.

Observation of a light track using the light track observation apparatus according to the present invention can be used in observation of a light track in various apparatuses such as shown in FIG. 12. Also, this light track observation apparatus can be used in various ways. For example, it is possible to evaluate optical elements (e.g., the focusing lens 25a shown in FIG. 2) used in the incident optical system of the excitation optical system by exchanging these elements and observing light tracks corresponding to the individual elements.

Furthermore, the light velocity and the like in a medium can be measured. This makes it possible to measure the refractive index of the medium, and, if a laser plasma is generated, measure the plasma density, plasma temperature, plasma dielectric constant, and the like. These measurements are applicable to observation and control of thermodynamics, e.g., observation of a non-equilibrium, high-energy state, laser abrasion of a semiconductor, laser abrasion of a liquid crystal, and laser light track used in laser processing.

INDUSTRIAL APPLICABILITY

The present invention can be used as a light track observation apparatus capable of directly observing the track of a light pulse. In particular, light track observation with high time resolution can be performed by using two synchronized light pulses, which are output from an ultrashort pulse laser or the like and respectively set in predetermined polarized states, as an excitation pulse as an observation object and a probe pulse as an observation prove.

An observation method uses a predetermined material as a detection medium. A change in the refractive index caused by a nonlinear optical effect produced in a region (light track region) in which excitation pulse light is distributed in the detection medium is detected by using a change in the polarized state of the probe pulse. Consequently, the light track region corresponding to an actual light track can be directly observed with a photodetector such as a CCD camera.

The invention claimed is:

1. A light track observation apparatus characterized by comprising:
    a light source part for generating and outputting first and second light beams having synchronized output timings, from a light pulse supplied by a pulse light source;
    a detection medium by which the track of a light pulse is detected and observed;
    an excitation optical system for forming an excitation pulse on the basis of the first light beam, and feeding the excitation pulse into said detection medium;
    a probe optical system for forming a probe pulse on the basis of the second light beam, and irradiating, with the probe pulse, a predetermined region of said detection medium, which includes a light track region in which the refractive index is changed by a nonlinear optical effect when the excitation pulse is fed into said detection medium; and
    a photodetection part for detecting the probe pulse which has passed through the predetermined region of said detection medium, wherein said excitation optical system comprises excitation pulse polarizing means for setting the excitation pulse into a predetermined polarized state, and an incident optical system for feeding the excitation pulse into said detection medium under predetermined incident conditions, said probe optical system comprises probed pulse polarizing means for setting the probe pulse into a predetermined polarized state, and said photodetection part comprises analyzing means for transmitting only a predetermined polarized light component of the probe pulse which has passed through the predetermined region of said detection medium, light detecting means for detecting and observing a two-dimensional optical image of the probe pulse transmitted through said analyzing means, and image forming means for forming, on said light detecting means, the two-dimensional optical image of the probe pulse which has passed through the predetermined region of said detection medium and which is transmitted through said analyzing means, thereby detecting the anisotropy of the refractive index in the light track region and observing the track of light of the excitation pulse.

2. A light track observation apparatus according to claim 1, characterized in that said light source part comprises a single pulse light source for outputting a light pulse, and beam splitting means for splitting the light pulse to generate the first and second light beams.

3. A light track observation apparatus according to claim 1, characterized in that said light source part comprises an excitation pulse light source for outputting a light pulse serving as the first light beam, a probe pulse light source for outputting a light pulse serving as the second light beam, and timing control means for synchronizing the output timings of the first and second light beams.

4. A light track observation apparatus according to claim 1, characterized in that one of said excitation optical system and probe optical system comprises variable light delay means for setting and changing an optical path length difference between said excitation optical system and probe optical system.

5. A light track observation apparatus according to claim 1, characterized in that said incident optical system comprises a movable optical system whose position in an optical path direction is movable.

6. A light track observation apparatus according to claim 1, characterized in that at least one of said excitation pulse polarizing means and probe pulse polarizing means comprises a wave plate or polarizer, the polarized states of the excitation pulse and probe pulse are respectively set to predetermined linearly polarized lights, the irradiation axis of the probe pulse with respect to said detection medium is in a plane which includes the incident axis of the excitation pulse with respect to said detection medium and which is perpendicular to the axis of the linearly polarized light of the excitation pulse, the axis of the linearly polarized light of the probe pulse is inclined 45° to the plane, and said analyzing means transmits, of the probe pulse which has passed through the predetermined region of said detection medium, only a polarized light component perpendicular to the linearly polarized light of the probe pulse which irradiates said detection medium.

7. A light track observation apparatus according to claim 1, characterized in that the irradiation angle the irradiation axis of the probe pulse makes with the incident axis of the excitation pulse is 90°.

8. A light track observation apparatus according to claim 1, characterized in that the irradiation angle the irradiation axis of the probe pulse makes with the incident axis of the excitation pulse is set at 0° to 90°, and said probe optical system comprises wavefront converting means for irradiating said detection medium with the probe pulse by matching the wavefront of the probe pulse with the wavefront of the excitation pulse.

9. A light track observation apparatus according to claim 1, characterized by further comprising an optical system holding mechanism which integrates and holds part or the whole of said excitation optical system, said probe optical system, and said photodetection part, which can rotate around the incident axis of the excitation pulse as a rotation axis, and which can change the set angles said excitation optical system, probe optical system, and photodetection part make with said detection medium.

10. A light track observation apparatus comprising:

a light source part for generating and outputting first and second light beams having synchronized output timings, from a light pulse supplied by a pulse light source;

a detection medium by which the track of a light pulse is detected and observed;

an excitation optical system for forming an excitation pulse on the basis of the first light beam, and feeding the excitation pulse into said detection medium;

a probe optical system for forming a probe pulse on the basis of the second light beam, and irradiating, with the probe pulse, a predetermined region of said detection medium, which includes a light track region in which the refractive index is changed by a nonlinear optical effect when the excitation pulse is fed into said detection medium; and a photodetection part for detecting the probe pulse which has passed through the predetermined region of said detection medium, wherein said excitation optical system comprises excitation pulse polarizing means for setting the excitation pulse into a predetermined polarized state, and an incident optical system for feeding the excitation pulse into said detection medium under predetermined incident conditions, said probe optical system comprises probed pulse polarizing means for setting the probe pulse into a predetermined polarized state, and said photodetection part comprises analyzing means for transmitting only a predetermined polarized light component of the probe pulse which has passed through the predetermined region of said detection medium, light detecting means for detecting and observing the probe pulse transmitted through said analyzing means, and image forming means for forming, on said light detecting means, an image of the probe pulse which has passed through the predetermined region of said detection medium and which is transmitted through said analyzing means, thereby detecting the anisotropy of the refractive index in the light track region and observing the track of light of the excitation pulse, characterized in that the irradiation angle the irradiation axis of the probe pulse makes with the incident axis of the excitation pulse is 90°, and characterized in that said photodetection part further comprises optical image converting means for converting a two-dimensional optical image of the probe pulse which has passed through the predetermined region of said detection medium, into a one-dimensional optical image, and said light detecting means comprises a one-dimensional photodetector.

11. A light track observation apparatus comprising:
a light source part for generating and outputting first and second light beams having synchronized output timings, from a light pulse supplied by a pulse light source;
a detection medium by which the track of a light pulse is detected and observed;
an excitation optical system for forming an excitation pulse on the basis of the first light beam, and feeding the excitation pulse into said detection medium;
a probe optical system for forming a probe pulse on the basis of the second light beam, and irradiating, with the probe pulse, a predetermined region of said detection medium, which includes a light track region in which the refractive index is changed by a nonlinear optical effect when the excitation pulse is fed into said detection medium; and
a photodetection part for detecting the probe pulse which has passed through the predetermined region of said detection medium,
wherein said excitation optical system comprises excitation pulse polarizing means for setting the excitation pulse into a predetermined polarized state, and an incident optical system for feeding the excitation pulse into said detection medium under predetermined incident conditions, said probe optical system comprises probed pulse polarizing means for setting the probe pulse into a predetermined polarized state, and
said photodetection part comprises analyzing means for transmitting only a predetermined polarized light component of the probe pulse which has passed through the predetermined region of said detection medium, light detecting means for detecting and observing the probe pulse transmitted through said analyzing means, and image forming means for forming, on said light detecting means, an image of the probe pulse which has passed through the predetermined region of said detection medium and which is transmitted through said analyzing means, thereby detecting the anisotropy of the refractive index in the light track region and observing the track of light of the excitation pulse,
characterized in that the irradiation angle the irradiation axis of the probe pulse makes with the incident axis of the excitation pulse is 90°, and
characterized in that said photodetection part comprises optical image converting means for converting a two-dimensional optical image of the probe pulse which has passed through the predetermined region of said detection medium, into a one-dimensional optical image, and spectroscopic means installed between said optical image converting means and light detecting means, and said probe optical system comprises a pulse stretcher for chirping the probe pulse.

12. A light track observation apparatus according to claim 1, characterized in that at least one of said excitation optical system and probe optical system comprises wavelength converting means for changing the wavelength of the excitation pulse or probe pulse.

13. A light track observation apparatus according to claim 1, characterized in that at least one of said excitation optical system and probe optical system comprises time waveform converting means for changing the time waveform, such as for each individual waveform or a pulse string arrangement, of the excitation pulse or probe pulse.

14. A light track observation apparatus according to claim 13, characterized in that said time waveform converting means is pulse string generating means for generating a pulse string having a variable time interval from the excitation pulse or probe pulse.

15. A light track observation apparatus according to claim 1, characterized in that at least one of said excitation optical system and probe optical system comprises spatial distribution converting means for changing the spatial distribution of the excitation pulse or probe pulse.

16. A light track observation apparatus according to claim 15, characterized in that said spatial distribution converting means is a slit mask which comprises one or a plurality of slits having a predetermined shape, and forms the spatial distribution of the excitation pulse or probe pulse into one or a plurality of slit shapes by the slit or slits.

17. A light track observation apparatus according to claim 16, characterized in that said slit mask further comprises an angle changing mechanism capable of changing the set angle in the longitudinal direction of the slit or slits.

18. A light track observation apparatus according to claim 1, characterized in that
first information is added to at lease one of a time waveform and spatial distribution of the excitation pulse,
second information is added to at least one of a time waveform and spatial distribution of the probe pulse, and
third information obtained from the first and second information is extracted by light track observation using the excitation pulse and probe pulse, thereby performing a predetermined operation.

19. A light track observation apparatus according to claim 18, characterized in that the first or second information is added to the excitation pulse or probe pulse by transmitting a predetermined sample before and after light stimulus is applied, and the operation of extracting change in the sample caused by the light stimulus is performed.

20. A light track observation apparatus according to claim 1, characterized by further comprising image processing means for processing image data from said light detecting means.

21. A light track observation apparatus according to claim 1, characterized in that
a pulse laser is used as the pulse light source of said light source part, a laser medium of said pulse laser is used as said detection medium, a light pulse in a resonator of said pulse laser is used as the excitation pulse, the probe pulse is formed from an output light pulse from said pulse laser, and
feedback is performed for a laser controller of said pulse laser on the basis of information of the observed excitation pulse, thereby optimizing and stabilizing the operation of said pulse laser.

* * * * *